United States Patent
Bhatia et al.

(10) Patent No.: US 11,036,867 B2
(45) Date of Patent: Jun. 15, 2021

(54) ADVANCED RULE ANALYZER TO IDENTIFY SIMILARITIES IN SECURITY RULES, DEDUPLICATE RULES, AND GENERATE NEW RULES

(71) Applicant: International Business Machines Corporation, Armonk, NY (US)

(72) Inventors: Aankur Bhatia, Bethpage, NY (US); Paul J. Dwyer, Pewaukee, WI (US); Yiye Huang, Aliso Viejo, CA (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 16/287,407

(22) Filed: Feb. 27, 2019

(65) Prior Publication Data

US 2020/0272741 A1 Aug. 27, 2020

(51) Int. Cl.
G06F 21/57 (2013.01)
G06F 21/55 (2013.01)
H04L 29/06 (2006.01)
G06F 40/20 (2020.01)

(52) U.S. Cl.
CPC .......... G06F 21/577 (2013.01); G06F 21/552 (2013.01); G06F 40/20 (2020.01); H04L 63/20 (2013.01)

(58) Field of Classification Search
CPC ...... G06F 21/577; G06F 40/20; G06F 21/552; H04L 63/20
See application file for complete search history.

(56) References Cited

U.S. PATENT DOCUMENTS

| 6,829,604 | B1 | 12/2004 | Tifft |
| 9,325,733 | B1 | 4/2016 | Kolman et al. |
| 10,049,220 | B1 | 8/2018 | Hatsutori et al. |
| 2006/0191010 | A1 | 8/2006 | Benjamin |
| 2007/0113292 | A1 | 5/2007 | Kao et al. |

(Continued)

OTHER PUBLICATIONS

Emoto, (Method for Extraction of Purchase Behavior and Product Character Using Dynamic Topic Model, IEEE, 2016 pp. 778-782) (Year: 2016).*

(Continued)

*Primary Examiner* — Oleg Korsak
(74) *Attorney, Agent, or Firm* — Stephen J. Walder, Jr.; Jeffrey S. LaBaw

(57) ABSTRACT

Mechanisms for performing advanced rule analysis are provided. The mechanisms perform natural language processing of a security rule set data structure, specifying a plurality of security rules. The mechanisms execute, for each security rule pairing, a determination of a similarity measure indicating a degree of similarity of the textual description of the first security rule in the pairing with the textual description of the second security rule in the pairing, and in response to the security measure being equal to or above duplicate rule threshold value, eliminating one of the first security rule or the second security rule in the pairing from the security rule set data structure to generate a modified security rule set data structure. The mechanisms deploy the modified security rule set data structure to a computing environment for use in identifying security incidents and performing event management.

16 Claims, 15 Drawing Sheets

(56) References Cited

U.S. PATENT DOCUMENTS

| | | | |
|---|---|---|---|
| 2010/0199346 A1* | 8/2010 | Ling | H04L 63/0263 726/12 |
| 2012/0221542 A1* | 8/2012 | Deng | G06F 16/24578 707/706 |
| 2012/0265763 A1* | 10/2012 | Meretab | G06F 16/338 707/741 |
| 2014/0007238 A1 | 1/2014 | Magee et al. | |
| 2014/0059641 A1 | 2/2014 | Chapman, II et al. | |
| 2014/0143825 A1 | 5/2014 | Behrendt et al. | |
| 2015/0163242 A1 | 6/2015 | Laidlaw et al. | |
| 2015/0222667 A1* | 8/2015 | Nayshtut | G06F 21/577 726/1 |
| 2016/0164909 A1 | 6/2016 | Satish et al. | |
| 2016/0212168 A1* | 7/2016 | Dotan | H04L 63/20 |
| 2016/0344738 A1 | 11/2016 | Dotan et al. | |
| 2017/0242868 A1* | 8/2017 | Doan | G06F 16/215 |
| 2018/0082208 A1 | 3/2018 | Cormier et al. | |
| 2018/0234457 A1 | 8/2018 | Rajkumar | |

OTHER PUBLICATIONS

Schofield et al. (Quantifying the Effects of Text Duplication on Semantic Models, Proceedings of the 2017 Conference on Empirical Methods in Natural Language Processing, pp. 2737-2747) (Year: 2017).*

Runeson et al. (Detection of Duplicate Defect Reports Using Natural Language Processing, 29th International Conference on Software Engineering (ICSE'07), 10 pages) (Year: 2007).*

Li, Susan, "Topic Modeling and Latent Dirichlet Allocation (LDA) in Python", Towards Data Science, May 31, 2018, 12 pages.

Nair, Goutam , "Text Mining 101: Topic Modeling", KDnuggets, Jul. 2016, 6 pages.

* cited by examiner

```
<rule overrideid="104002" owner="admin" scope="LOCAL" type="EVENT" roleDefinition="false" buildingBlock="false" enabled="true"
id="104002"><name>Abnormal Parent for a System Process </name><notes></notes><testDefinitions><test requiredCapabilities=
"EventViewer.RULECREATION|SURVEILLANCE.RULECREATION" group="Log Source Tests" uid="0" name=
"com.q1labs.semsources.cre.tests.DeviceTypeID_Test" id="14"><text>when the event(s) were detected by one or more of <a
href="javascript:editParameter('0", "1")' class='dynamic'>Microsoft Windows Security Event Log</a><text><parameter id="1"><initialText>
these log source types</initialText><selectionLabel>Select a Log Source type and click 'Add' </selectionLabel><userOptions multiselect="true"
method="com.q1labs.sem.ui.semservices.UISemServices.getDeviceTypeDescs" source="class"
format="list"/><userSelection>12</userSelection><userSelectionTypes><userSelectionId>0</userSelectionId>
</parameter></test><test requiredCapabilities="EventViewer.RULECREATION|SURVEILLANCE.RULECREATION" group="Event Property
Tests" uid="3" name="com.q1labs.semsources.cre.tests.QID_Test" id="19"><text>when the event QID is one of the following
<a href='javascript:editParameter("3", "1")' class='dynamic'>(5001828) Process Create</a></text><parameter id="1">
<initialText>QIDs</initialText><selectionLabel>Browse or Search for QIDs below. Select the
desired QIDs and click 'Add'</selectionLabel><userOptions multiselect="true" method=
"com.q1labs.sem.ui.semservices.UISemServices.getQidsByLowLevelCategory"
source="class" format="CustomizeParameter-
QID.jsp"/><userSelection>5001828</userSelection><userSelectionTypes><userSelectionId>0</userSelectionId>
</parameter></test><test requiredCapabilities="EventViewer.RULECREATION|SURVEILLANCE.RULECREATION" group="Common Property Tests"
uid="2" name="com.q1labs.semsources.cre.tests.PropertyRegex" id="225"><text>when any of <a href="javascript:editParameter('2", "1")'
class= 'dynamic'>ImageName (custom)</a> match <a href="javascript:editParameter('2", "2")'
class='dynamic'>{(?i)smss.exe|winint.exe|taskhost.exe|Isass.exe|winlogon.exe|explorer.exe|Ism.exe|svchost.exe|csrss.exe|cmd.exe|
iexplore.exe</a></text><parameter id="1"><initialText>these properties</initialText><selectionLabel>Select a property and click
'Add'</selectionLabel><userOptions multiselect="true" method="com.q1labs.sem.ui.semservices.UISemServices.getEventDatabaseFields"
source="class" format="list"/>userSelection>ImageName</userSelection><userSelectionTypes></userSelectionTypes><userSelectionId>
0</userSelectionId></parameter><parameter id="2"><initialText>this regular expression</initialText><selectionLabel>Enter a value</selectionLabel>
<userOptions multiselect="false" errorkey="12000" validation="com.q1labs.core.ui.util.ValidatorUtils.validateRegularExpression" source="user"
format="user"/><userSelection>(?i)smss.exe|wininit.exe|taskhost.exe|Isass.exe|winlogon.exe|explorer.exe|Ism.exe|svchost.exe|services.exe|
csrss.exe|cmd.exe|iexplore.exe</userSelection><userSelectionTypes><userSelectionId>0</userSelectionId><property</userSelectionTypes>
</parameter></test><test
```

FIG. 2

| Rule Name | Tests | Enabled | Building Block | ID | Notes | Response | Create Offense |
|---|---|---|---|---|---|---|---|
| Abnormal Parent for a System Process | when the event(s) were detected by one or more of Microsoft Windows Security Event Log when the event QID is one of the following (5001828) Process Create when any of ImageName (custom) match (?i)smss.exe \| wininit.exe \| taskhost.exe \| lsass.exe \| winlogon.exe \| explorer.exe \| lsm.exe \| svchost.exe \| services.exe \| csrss.exe \| cmd.exe \| iexplore.exe when the event matches REFERENCEMAPSETCONTAINS ('ProcessMaptoProcessParentPath', LOWER("ImageName"), LOWER("ParentImage")) != True AQL filter query | TRUE | FALSE | 104002 | | New Event | TRUE |
| Devices With High Event Rates | when any of these BB:DeviceDefinition: Devices to Monitor for High Event Rates with the same log source more than 500 times, across more than 0 destination IP within 1 minutes | FALSE | FALSE | 100001 | Monitors devices for high event rates. The default threshold is set very low for most network devices and should be adjusted before the rule is enabled. To configure which devices will be monitored edit the building block 'BB:DeviceDefinition: Devices to Monitor for High Event Rates' | New Event | TRUE |

FIG. 3

| | Rule Name | token_stem | n | tf | idf | tf_idf |
|---|---|---|---|---|---|---|
| 38 | _PaloAlto: Possible TLS handshake failure | match | 1 | 0.05263158 | 0.6883739 | 0.03623021 |
| 39 | _PaloAlto: Possible TLS handshake failure | port | 1 | 0.05263158 | 1.5356718 | 0.08082483 |
| 40 | _PaloAlto: Possible TLS handshake failure | qid | 1 | 0.05263158 | 1.9083470 | 0.10043932 |
| 41 | _PaloAlto: Possible TLS handshake failure | reason | 1 | 0.05263158 | 6.0354814 | 0.31765692 |
| 42 | _PaloAlto: Possible TLS handshake failure | rst | 1 | 0.05263158 | 6.0354814 | 0.31765692 |
| 43 | _PaloAlto: Possible TLS handshake failure | session | 1 | 0.05263158 | 4.2437220 | 0.22335379 |
| 44 | _PaloAlto: Possible TLS handshake failure | tcp | 1 | 0.05263158 | 2.9909590 | 0.15741889 |
| 45 | _PaloAlto: Possible TLS handshake failure | traffic | 1 | 0.05263158 | 4.6491871 | 0.24469406 |

FIG. 4

| | Rule Name.x | Rule Name.y | value |
|---|---|---|---|
| 867 | _PaloAlto: Possible TLS handshake failure | BB:CategoryDefinition: Database Connections | 5.778918e-03 |
| 868 | _PaloAlto: Possible TLS handshake failure | BB:CategoryDefinition: DDoS Attack Events | 1.444115e-02 |
| 869 | _PaloAlto: Possible TLS handshake failure | BB:CategoryDefinition: Exploits Backdoors and Trojans | 2.735151e-03 |
| 870 | _PaloAlto: Possible TLS handshake failure | BB:CategoryDefinition: Firewall or ACL Accept | 2.217822e-01 |
| 871 | _PaloAlto: Possible TLS handshake failure | BB:CategoryDefinition: Firewall or ACL Denies | 5.988120e-04 |
| 872 | _PaloAlto: Possible TLS handshake failure | BB:CategoryDefinition: High Magnitude Events | 1.914758e-03 |
| 873 | _PaloAlto: Possible TLS handshake failure | BB:CategoryDefinition: IRC Detected Based on Applica... | 5.647340e-03 |

| | | |
|---|---|---|
| Enter a rule number in range, 0 - 418 to find matching rules: 38 | Enter a threshold for checking similarity, example for 60% enter 60 : 70| | ← 710 |

← 720

6 other rules found with similarity score above 70 % to rule : AssetExclusion: Exclude MAC Address By IP Out [70]:

| | # | RuleName (734) | Tests (736) | Score (738) |
|---|---|---|---|---|
| 730 → | 31 | AssetExclusion: Exclude IP By MAC Address | when the event matches identity IP is not 0\rwhen any of Identity IP are contained in any of asset Reconciliation IPv4 Whitelist - IP, Asset Reconciliation IPv4 Blacklist - IP\rwhen at least 3 events are seen with the same identity IP and different Identity MAC in 2 hour(s)\r | 0.706995 |
| | 33 | AssetExclusion: Exclude DNS Name By IP | when the event matches Has Identity is True\rwhen any of Identity Host Name are contained in any of Asset Reconciliation DNS Whitelist - AlphaNumeric (Ignore Case), Asset Reconciliation DNS Blacklist - AlphaNumeric (Ignore Case)\rwhen at least 3 events are seen with the same Identity Host Name and different Identity IP in 2 hour(s)\r | 0.738560 |
| ⇒ | 38 | AssetExclusion: Exclude MAC Address By IP | when the event matches Has Identity is True\rwhen any of Identity MAC are contained in any of Asset Reconciliation MAC Whitelist - AlphaNumeric (Ignore Case), Asset Reconciliation MAC Blacklist - AlphaNumeric (Ignore Case)\rwhen at least 3 events are seen with the same Identity MAC and different Identity IP in 2 hour(s)/r ← 740 | 1.000000 |
| ⇒ | 40 | AssetExclusion: Exclude MAC Address By DNS Name | when the event matches Has Identity is True\rwhen any of Identity MAC are contained in any of Asset Reconciliation MAC Whitelist - AlphaNumeric (Ignore Case), Asset Reconciliation MAC Blacklist - AlphaNumeric (Ignore Case)\rwhen at least 3 events are seen with the same Identity MAC and different Identity Host Name in 2 hour(s)/r ← 742 | 0.986276 |
| | 246 | AssetExclusion: Exclude DNS Name By MAC Address | when the event matches Has Identity is True\rwhen any of Identity Host Name are contained in any of Asset Reconciliation DNS Whitelist - AlphaNumeric (Ignore Case), Asset Reconciliation DNS Blacklist - AlphaNumeric (Ignore Case)\rwhen at least 3 events are seen with the same Identity Host Name and different Identity MAC in 2 hour(s) | 0.817321 |
| ⇒ | 247 | AssetExclusion: Exclude MAC Address By NetBIOS Name | when the event matches Has Identity is True\rwhen any of Identity MAC are contained in any of Asset Reconciliation MAC Whitelist - AlphaNumeric (Ignore Case), Asset Reconciliation MAC Blacklist - AlphaNumeric (Ignore Case)\rwhen at least 3 events are seen with the same Identity MAC and different Identity NetBIOS Name in 2 hour(s)/r ← 744 | 0.972156 |
| | 251 | AssetExclusion: Exclude NetBIOS Name By MAC Address | when the event matches Has Identity is True\rwhen any of Identity NetBIOS Name are contained in any of Asset Reconciliation NetBIOS Whitelist - AlphaNumeric (Ignore Case), Asset Reconciliation NetBIOS Blacklist - AlphaNumeric (Ignore Case)\rwhen at least 3 events are seen with the same Identity NetBIOS Name and different Identity MAC in 2 hour(s)/r | 0.750174 |

FIG. 8

| Category | Subcategory | Informative References |
|---|---|---|
| Asset Management (ID.AM): The data, personnel, devices, systems, and facilities that enable the organization to archive business purposes are identified and managed consistent with their relative importance to organizational objectives and the organization's risk strategy. | ID.AM-1: Physical devices and systems within the organization are inventoried | - CIS CSC 1<br>- COBIT 5 BAI09.01, BAI09.02<br>- ISA62443-2-1:2009 4, 2, 3, 4<br>- ISA62443-3-3:2013 SR 7, 8<br>- ISO/IEC27001:2013 A.8.1.1, A.8.1.2<br>- NIST SP800-53 Rev. 4 CM-8, PM-5 |
| | ID.AM-2: Software platforms and applications within the organization are inventoried | - CIS CSC 2<br>- COBIT 5 BAI09.01, BAI09.02, BAI09.05<br>- ISA62443-2-1:2009 4, 2, 3, 4<br>- ISA62443-3-3:2013 SR 7, 8<br>- ISO/IEC27001:2013 A.8.1.1, A.8.1.2, A.125.1<br>- NIST SP800-53 Rev. 4 CM-8, PM-5 |
| | ID.AM-3: Organizational communication and data flows are mapped | - CIS CSC 12<br>- COBIT 5 DSS05.02<br>- ISA62443-2-1:2009 4, 2, 3, 4<br>- ISO/IEC27001:2013 A.13.2.1, A.13.2.2<br>- NIST SP800-53 Rev. 4 AC-4, CA-3, CA-9, PL-8 |
| | ID.AM-4: External information systems are catalogued | - CIS CSC 12<br>- COBIT 5 APO02.02, APO10.04, DSS01.02<br>- ISO/IEC27001:2013 A.11.2.6<br>- NIST SP800-53 Rev. 4 AC-20, SA-9 |
| | ID.AM-5: Resources (e.g., hardware, devices, data, time, personnel, and software) are prioritized based on their classification, criticality, and business value | - CIS CSC 13, 14<br>- COBIT 5 APO03.03, APO03.04, APO12.01, BAI04.02, BAI09.02<br>- ISA62443-2-1:2009 4, 2, 3, 6<br>- ISO/IEC27001:2013 A.8.2.1<br>- NIST SP800-53 Rev. 4 CP-2, RA-2, SA-14, SC-6 |

| | XmlEvent | Cleaned_Events |
|---|---|---|
| 87 | \nwhen %1% match at least %2% times with the same %3% and different %4% in %5% %6% after %7% match with the same %8%\n\ngetEventRules \nSelect the rule(s)\nthese rules\n\n \n\n\nEnter a value\nthis many\n\n \n\n\nevent properties\nSelect a event property and click 'Add'\n\n \n\n\nEnter a value\nthis many\n\n \n\n\nSelect a event property and click 'Add'\n\n\nEnter a value\nthis many\n\n \n\n\ngetEventRules \nSelect the rule(s)\nthese unit\nminutes\n\nminutes\n\nhour(s)\n\nday(s)\n\n \n\n\nm\n\n\n\ngetEventRules \nSelect the rule(s)\nthese rule... | when match at least times with the same and different in after match with the same getEventRules Select the rule s these rules Enter a value this many event properties Select a event property and click Add event properties Select a event property and click Add Enter a value this many Select a time unit minutes minutes hour s day s m getEventRules Select the rule s these rules event properties Select a event propert... |
| 88 | \nwhen at least %2% events are seen with the same %3% and different %4% in %5% %6% after %7% match\n\n\n\ngetEventRules \nSelect the rule(s)\nthese rules\n\n \n\n\nEnter a value\nthis many\n\n \n\n\nevent properties\nSelect a event property and Click 'Add'\n\n \n\n\nEnter a value\nthis many\n\n \n\n\nSelect a event property and click 'Add'\n\n \n\n\nEnter a value\nthis many\n\n \n\n\nSelect a time unit\nminutes\n\nminutes\n\nhour(s)\n\nday(s)\n\n \n\n\ngetEventRules \nSelect the rule(s)\nthese rules\n\n \n\n\nevent, .. | when at least events are seen with the same and different in after match getEventRules Select the rule s these rules Enter a value this many event properties Select a event property and click Add event properties Select a event property and click Add Enter a value this many Select a time unit minutes minutes hour s day s m getEventRules Select the rule s these rules event properties Select a event property and click Add ... |
| 89 | \nwhen at least %2% events are seen with the same %3% in %5% %6% after %7% match with the same %8%\n\ngetEventRules \nSelect the rule(s)\nthese rules\n\n \n\n\nEnter a value\nthis many\n\n \n\n\nevent properties \nSelect a event property and click 'Add'\n\n \n\n\nEnter a value\nthis many\n\n \n\n\nevent properties \nSelect a event property and click 'Add'\n\n \n\n\nEnter a value\nthis many\n\n \n\n\nSelect a time\n\nmany\n\n \n\n\ngetEventRules \nSelect the rule(s)\nthese rules\n\n \n\n\nevent .. | when at least events are seen with the same in after match with the same getEventRules Select the rule s these rules Enter a value this many event properties Select a event property and click Add event properties Select a event property and click Add Enter a value this many Select a time unit minutes minutes hour s day s m getEventRules Select the rule s these rules event properties Select a event property and click Add ... |
| 90 | \nwhen at least %2% events are seen with the same %3% and different %4 in %5% %6%\n\nafter %7% match with the same %8%\n\ngetEventRules \nSelect the rule(s)\nthese rules\n\n \n\n\nEnter a value\nthis many\n\n \n\n\nevent properties\nSelect a event property and click 'Add'\n\n \n\n\nEnter a value\nthis many\n\n \n\n\n'Add'\n\n \n\n\nevent properties \nSelect a event property and click 'Add'\n\n \n\n\nEnter a value\nthis many\n\n \n\n\nSelect a time value\nthis\n\nmany\n\n \n\n\ngetEventRules \nSelect the rule(s)\nthese rule... | when at least events are seen with the same and different in after match with the same getEventRules Select the rule s these rules Enter a value this many event properties Select a event property and click Add event properties Select a event property and click Add Enter a value this many Select a time unit minutes minutes hour s day s m getEventRules Select the rule s these rules event properties Select a event propert... |
| 91 | \nwhen none of %1% match in %2% %3% after %4% match with the same %5%\n\ngetEventRules \nSelect the rule(s)\nthese rules\n\n \n\n\n\n\nEnter a value\nthis\n\nmany\n\n \n\n\n\n\ngetEventRules \nSelect the rule(s)\nthese rules\n\n \n\n\nhour(s)\n\nday(s)\n\n \n\n\nm\n\n \n\n\ngetEventRules \nSelect the rule(s)\nthese rules\n\n \n\n\nevent properties\nSelect a flow property and click 'Add'\n\n \n\n | when none of match in after match with the same getEventRules Select the rule s these rules Enter a value this many Select a time unit minutes minutes hour s day s m getEventRules Select the rule s these rules event properties Select a flow property and click Add |

FIG. 10A

| Id | Log Source Type Name | Log Source Type | Function |
|---|---|---|---|
| 106 | Threecom8800SeriesSwitch | 3Com 8800 Series Switch | Router and Switch |
| 353 | AhnLabPolicyCenter | AhnLab Policy Center APC | EDR |
| 321 | AkamaiKona | Akamai KONA | WAF |
| 347 | AmazonAWSCloudTrail | Amazon AWS CloudTrail | Logging |
| 47 | IpAngel | Ambiron TrustWave ipAngel Intrusion Prevention System (IP | IDS/IPS |
| 207 | AnomalyDetectionEngine | Anomaly Detection Engine | QRadar System |
| 10 | Apache | Apache HTTP Server | Web Server |
| 272 | APCUninterruptiblePowerSupply | APC UPS | UPS |
| 280 | AppSecDbProtect | Application Security DbProtect | Database Security |
| 4001 | ApplicationtestCustom | application-test | QRadar System |
| 330 | PeakflowSp | Arbor Networks Peakflow SP | DDos Protection and Prevention |
| 345 | ArborNetworkPravail | Arbor Networks Pravail | DDos Protection and Prevention |
| 299 | ArpeggioSIFTIT | Arpeggio SIFT-IT | Cloud Security |
| 55 | ArrayVPN | Array Networks SSL VPN Access Gateways | VPN |
| 391 | ArubaClearPass | Aruba ClearPass Policy Manager | Wireless NAC |
| 155 | Mobility | Aruba Mobility Controller | Wireless NAC |
| 267 | AssetProfiler | Asset Profiler | QRadar System |
| 354 | AvayaVPNGateway | Avaya VPN Gateway | VPN |
| 278 | BarracudaFirewall | Barracuda Spam & Virus Firewall | Email Security |
| 281 | BarracudaWAF | Barracuda Web Application Firewall | WAF |
| 300 | BarracudaWebFilter | Barracuda Web Filter | Web Proxy |
| 230 | Bit9Parity | Bit9 Security Platform | EDR |
| 103 | Bluecoat | Blue Coat SG Appliance | Web Proxy |
| 399 | BluecoatWebSecurityService | Blue Coat Web Security Service | Web Security Services |
| 285 | BlueCatNetworksAdonis | BlueCat Networks Adonis | DNS |
| 365 | CloudFoundry | Bluemix Platform | Cloud Security |
| 405 | Box | Box | Storage |
| 143 | BridgewaterAAA | Bridgewater Systems AAA Service Controller | AAA |
| 302 | BrocadeFabricOS | Brocade FabricOS | Router and Switch |

FIG. 10B

| Tests | CleanTests | logSources |
|---|---|---|
| when the event(s) were detected by one or more of Microsoft Windows Security Event Log\rwhen the event QID is one of the following (5001828) Process Create\rwhen any of ImageName (custom) match (?-e\winit.exe\|taskhost.exe\|lsass.exe\|winlogon.exe\|explorer.exe\|lsm.exe\|svchost.exe\|services.exe\|csrss.exe\|cmd.exe\|iexplore.exe\rwhen the event matches REFERENCEMAPSETCONTAINS('ProcessMaptoProcessParentPath', LOWER(""ImageName"), LOWER(""ParentImage")) != True AQL filter query\r | event detected one microsoft windows security event log event qid one following 5001828 process create imagename custom match smss.exe wininit.exe taskhost.exe lsass.exe winlogon.exe lsm.exe svchost.exe explorer.exe crss.exe cmd.exe services.exe crss.exe cmd.exe iexplore.exe event matches referencemapsetcontains processmaptoprocessparentpath lower imagename lower parentimage true aql filter query | ['microsoft windows security event'] |
| any of these BB:Device Definition: Devices to Monitor for High Event Rates with the same log source more than 500 times, across more than 0 destination IUP within 1 minutes\r | bb devicedefinition devices monitor high event rates log source 500 times across 0 destination ip within 1 minutes | □ |
| when the event(s) were detected by one or more of Microsoft Windows Security Event Log\rwhen the event QID is one of the following 8) Process Create\rwhen the event matches PS Encoded Command (custom) is not N/A\rwhen the event matches REPLACEALL("(\"", DECODERS;:BASE64DECODE("\*DownloadFile.\*(Start\\?Process\|start\|saps).\*\|Net\\?WebClient.\*DownloadFile.\*(Start\\?Process\|start\|saps).\*\|(.\*(iex\|Invoke-Expression)?\*New\\?Object\\?Is\*(System\\?).)?WebClient.\*DownloadString.\*)\|(.\*New\\?Object\\?Is\*(System\\?).)?Net\\?WebClient.\*DownloadString.\*(iex\|Invoke-Expression)?.\*))" AQL filter query\r | event detected one microsoft windows security event log event qid one following 5001828 process create event matches ps encoded command custom n event matches replaceall decoders base64decode ps encoded command imatches . . . new object system . net webclient. downloadfile. start process start saps . . iex invoke expression. new object system . net . webclient. downloadstring. . . new object system . net . webclient. downloadstring. iex Invoke expression . aql filter | ['microsoft windows security event'] |

FIG. 10C

ADVANCED RULE ANALYZER TO IDENTIFY SIMILARITIES IN SECURITY RULES, DEDUPLICATE RULES, AND GENERATE NEW RULES

BACKGROUND

The present application relates generally to an improved data processing apparatus and method and more specifically to an advanced rule analyzer mechanism for identifying similarities between security rules, e.g., Security Incident and Event Management (SIEM) rules, performing deduplication and merging of similar rules, and generating new rules where needed based on a cognitive analysis.

Security Incident and Event Management (SIEM) is an approach to security management that combines security information management (SIM) with security event management (SEM) functions into a single security management system. A SIEM tool or system aggregates data from various data sources in order to identify deviations in the operation of the computing devices associated with these data sources from a normal operational state and then take appropriate responsive actions to the identified deviations. SIEM systems may utilize multiple collection agents that gather security related events from computing devices, network equipment, firewalls, intrusion prevention systems, antivirus systems, and the like. The collection agents may then send this information, or a subset of this information that has been pre-processed to identify only certain events for forwarding, to a centralized management console where security analysts examine the collected event data and prioritize events as to their security threats for appropriate responsive actions. The responsive actions may take many different forms, such as generating alert notifications, inhibiting operation of particular computer components, or the like.

IBM® QRdar® Security Intelligence Platform is an example of one SIEM system which is designed to detect well-orchestrated, stealthy attacks as they are occurring and immediately set off the alarms before any data is lost. By correlating current and historical security information, the IBM® QRadar® Security Intelligence Platform solution is able to identify indicators of advanced threats that would otherwise go unnoticed until it is too late. Events related to the same incident are automatically chained together, providing security teams with a single view into the broader threat. With QRadar®, security analysts can discover advanced attacks earlier in the attack cycle, easily view all relevant events in one place, and quickly and accurately formulate a response plan to block advanced attackers before damage is done.

In many STEM systems, the STEM operations are implemented using SIEM rules that perform tests on computing system events, data flows, or offenses, which are then correlated at a central management console system. If all the conditions of a rule test are met, the rule generates a response. This response typically results in an offense or incident being declared and investigated.

Currently, SIEM rules are created, tested, and applied to a system manually and sourced from out of the box rules (base set of rules that come with a STEM system), use case library rules ("template" rules provided by provider that are organized by category, e.g., NIST, Industry, etc.), custom rules (rules that are manually developed based on individual requirements), and emerging threat rules (manually generated rules derived from a "knee jerk" reaction to an emerging threat or an attack). All of these rules must be manually created, tested and constantly reviewed as part of a rule life-cycle. The life-cycle determines if the rule is still valid, still works, and still applies. Furthermore, the work involved in rule management does not scale across different customer STEM systems due to differences in customer industries, customer systems, log sources, and network topology.

SIEM rules require constant tuning and upkeep as new systems come online, new software releases are deployed, and new vulnerabilities are discovered. Moreover, security personnel can only create SIEM rules to detect threats that they already know about. SIEM rules are not a good defense against "Zero Day" threats and other threats unknown to the security community at large.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, wherein the at least one memory comprises instructions which are executed by the at least one processor and specifically configure the at least one processor to implement an advanced rule analyzer. The method comprises performing, by the advanced rule analyzer executing in the data processing system, natural language processing of a security rule set data structure, specifying a plurality of security rules, to identify textual descriptions of tests performed by each of the security rules in the security rule set data structure. The method further comprises executing, by the advanced rule analyzer, for each security rule pairing comprising a pairing of a first security rule in a plurality of security rules with a second security rule in the plurality of security rules, a determination of a similarity measure indicating a degree of similarity of the textual description of the first security rule in the pairing with the textual description of the second security rule in the pairing, and in response to the security measure being equal to or above duplicate rule threshold value, eliminating one of the first security rule or the second security rule in the pairing from the security rule set data structure to generate a modified security rule set data structure. Moreover, the method comprises deploying, by the advanced rule analyzer, the modified security rule set data structure to a computing environment for use in identifying security incidents and performing event management.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is an example diagram of an XML formatted document data structure corresponding to a portion of a security rule set, such as a STEM rule set, which may be received by the ARA for processing;

FIG. 3 is an example diagram illustrating a parsed and reformatted version of the security rule set data structure shown in FIG. 2;

FIG. 4 is an example diagram of a portion of a graphical user interface in which statistically significant portions of text present in the test portion of a SIEM rule definition are represented along with their statistical measures of significance in accordance with one illustrative embodiment;

FIG. 5 is an example diagram of a portion of a graphical user interface in which similarity scores are represented with regard to pairings of rules in a STEM rule set data structure in accordance with one illustrative embodiment;

FIG. 7 is an example diagram illustrating a portion of a graphical user interface through which a user may specify criteria for identifying substantially similar security rules and obtain a visualization of the substantially similar security rules according to the user specified criteria, in accordance with one illustrative embodiment;

FIG. 8 is an example diagram illustrating one arrangement of a framework definition in which categories and subcategories (or topics) are specified along with corresponding textual descriptions in accordance with one illustrative embodiment;

FIG. 10A is an example diagram illustrating the security rules that may be provided by a security incident and event management (SIEM) tools provider computing system to a rule decomposition engine in accordance with one illustrative embodiment;

FIGS. 10B and 10C are example diagrams illustrating a portion of log source information and mapping of log source with tests of security rules in accordance with one illustrative embodiment;

DETAILED DESCRIPTION

Figure 1:
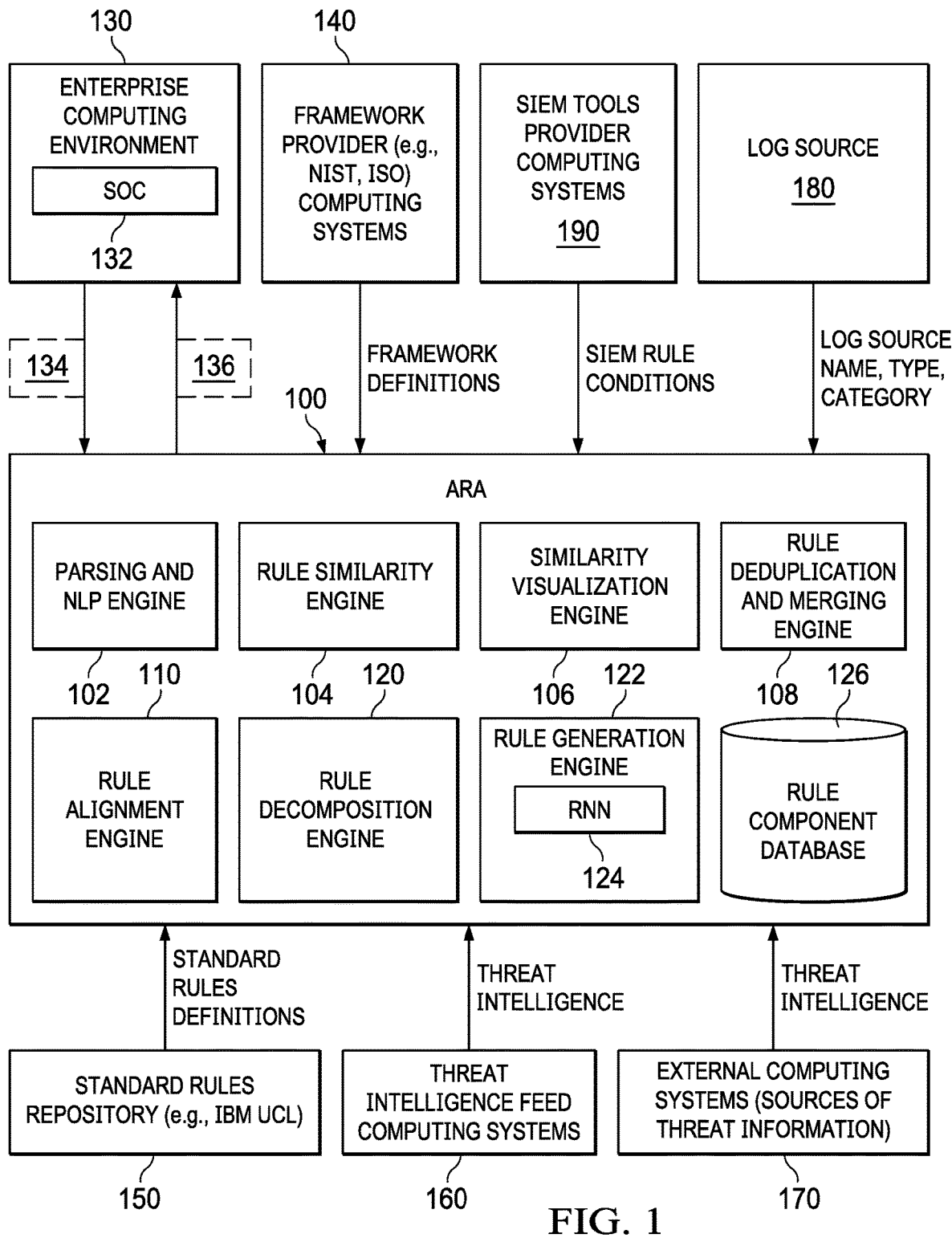
FIG. 1 is an example diagram illustrating the interaction of the Advanced Rule Analyzer (ARA) with a variety of computing systems to perform rule similarity, rule decomposition, and rule alignment, rule generation, and rule management operations in accordance with one illustrative embodiment.

A Security Incident and Event Management (SIEM) tool or system is the backbone of threat monitoring and detection in a security operations center (SOC). As mentioned above, the SIEM tool or system uses rule correlation to trigger offenses when specific events meet rule threshold criteria. These offenses are then examined by a human or machine analyst to make decisions on whether or not to escalate the offense as a "security incident" and take appropriate remediation action. A security rule, such as a SIEM rule, or simply "rule", is a data structure that specifies a series of complex logical statements that include correlation logic on log sources, conditions, operators, and thresholds for rule firing, e.g., generating an alert notification as to a detected threat. An example SIEM tool or system installation comes with over 100-300 "out of the box" rules and several more are added when new log sources are commissioned, or new threat intelligence feeds are received. New custom rules are also added continuously on client requests or when a change is detected in the environment.

These new security rules, hereafter assumed to be SIEM rules for purposes of illustration, are manually created by security rule specialists, e.g., SIEM specialists, or rule correlation engineers. Since this is a manual process, rule creation is a time consuming and expensive undertaking requiring specialized skills. In addition, over a period of time, a SIEM environment amasses several hundred rules, many of which may be duplicates, or near duplicates, since different SIEM specialists may be involved in creation of rules and/or the rule set may be so large as to be difficult for a human being to identify similar rules already existing in the rule set. Thus, most enterprises are not equipped to manage the large scale SIEM rules portfolios. As a result, the SIEM tools or systems may generate an extraordinary number of false positives, due to duplicate or substantially similar rules being evaluated, causing expensive human analyst resources to be diverted to unimportant alerts of threats since each threat alert must be investigated by the human analyst. There currently is no mechanism for automatically identifying such duplicate or similar STEM rules for manual or automatic reduction of SIEM rule set size and thereby decrease the number of false positives requiring human analyst resources to investigate.

As noted above, rule generation is currently a manual process requirement many hours of human analyst time, and human analyst expertise, to accomplish. Rule generation is also generally a reactionary endeavor in reaction to newly identified threats. Thus, the number of hours a human analyst must spend generating new rules to address the newly identified threats means that there is a period of time that the new threats are not being identified as they proliferate in enterprise computing environments. There is currently no automated mechanism to generate new SIEM rules in response to identified threats, such that the amount of time required by human analysts in generating new rules is minimized.

In addition, enterprises often have no understanding as to how well their current STEM rule set protects their assets in accordance with known standards or with other available rule sets. For example, there are a number of standards organizations, such as National Institute of Standards and Technology (NIST) and International Organization for Standardization (ISO) that have developed frameworks, or standards, for securing computing resources against threats. However, there currently is no mechanism for informing enterprises as to how well their STEM rules align with these frameworks, i.e. identifying what topics in the frameworks are addressed by the enterprise's STEM rules and which topics in the frameworks are not addressed by the enterprise's SIEM rules. Moreover, there is no mechanism currently available that identifies which topic(s) of a framework with which each of the enterprise's STEM rules correlate.

The same is true of other SIEM rule sets, such as in standard rule repositories. That is, standard rule repositories of STEM rules may be established by organizations, where these standard rule repositories store STEM rules which have been determined by the organizations to be well crafted to address certain types of threats, e.g., the IBM Use Case Library rule repository, available from International Business Machines (IBM) Corporation of Armonk, N.Y., is one type of standard rule repository. These standard rule repositories are established for use by enterprise SOCs, but are generally accessed in a manual manner and provide guidance for human analysts for incorporating the standard rules into their own STEM rule sets used by their SOCs. However, there is no current mechanism that aligns an enterprise's SIEM rule set with the rules in these standard repositories to provide guidance to human analysts as to potential rules in the standard repositories that may be added to the enterprise's STEM rule set, i.e. those rules in the standard repositories that do not align well with STEM rules in the enterprise's STEM rule set may be candidates for addition to the enterprise's SIEM rule set, to improve the enterprise's STEM rule set.

The illustrative embodiments provide an Advanced Rule Analyzer (ARA) that provides a machine learning solution to the SIEM rule management issues of known STEM tools in computing systems, such as those mentioned above. In particular, the improved computing tool of the illustrative embodiments is specifically directed to a machine learning or cognitive computing model that operates to analyze rules used by a SOC in an enterprise environment, e.g., a client or customer environment, to determine if the rule set being used includes any duplicate or substantially similar rules that may be eliminated or merged together to reduce the rule set being utilized. The identified duplicate rules may be flagged for deduplication by reducing the number of duplicate rules to a single rule implemented by the SOC. The identified substantially similar rules may be flagged for merging into a single rule, referred to herein as a "super rule," that combines the features of each of the rules being merged. The flagged rules may be presented to a human analyst for deduplication/merging or may be automatically deduplicated/merged. For example, in an automated process, all instances of the duplicate rules may be removed except for a single instance and substantially similar rules may be merged by generating a super rule having a single instance of the common portions of the similar rules, and concatenating or otherwise merging the differing portions of the similar rules, thereby replacing the substantially similar rules with a single super rule in the STEM rule set.

The illustrative embodiments further provide a mechanism for visualization of the similarity between rules in the rule set(s) in order to present a visual representation easily understandable by human analysts for decision making purposes. In one illustrative embodiment, the visualization may include a heat map visualization that represents the degree of similarity between pairs of rules in the SIEM rule set, with visual features, such as coloring, in the visualization representing the degree of similarity. In some illustrative embodiments, the visualization may include a listing of similar rules, including their various characteristics, such as rule identifier, rule name, tests performed by the rule, similarity score, and the like, with differences between similar rules being highlighted or otherwise accentuated in the visualization.

In addition, in some illustrative embodiments, user interfaces are provided for permitting a user to specify criteria for controlling the operations of the ARA with regard to required levels of similarity, actions to be performed, and the like. For example, a user may specify a rule of interest, against which the user wishes to find other duplicate or similar rules. The user may also specify a threshold similarity score required by the user for identification of similar rules, e.g., 70% meaning that the user wants to be informed of other rules in the STEM rule set that have a similarity of 70% or more to the rule of interest. The illustrative embodiments provide mechanisms for identifying those other SIEM rules that meet these similarity criteria and generate a visualization of the results, such as a heat map output, similar rules listing with differences highlighted or accentuated, etc.

Thus, in one aspect of the illustrative embodiments, automated mechanisms are provided for identifying duplicate and similar rules in a STEM rule set for deduplication and/or merging into a super rule. In some cases, the deduplication and merging may be performed automatically. However, even in cases where a human analyst is involved in the deduplication and/or merging, the illustrative embodiments provide automated mechanism for identifying the candidates for such deduplication and merging, which greatly reduces the amount of manual effort that would otherwise be required to perform such identification on the part of a human analyst. As a result of either the automatic or manual deduplication/merging based on the automated identification by the mechanisms of the illustrative embodiments, the size of the rule set implemented by an enterprise may be reduced. In operation, due to the reduced size of the rule set implemented by the enterprise's SOC, fewer false positives are generated, requiring fewer human analyst man hours to investigate the corresponding threat alerts.

In an additional aspect of the illustrative embodiments, the ARA provides mechanisms for aligning rules with frameworks, such as those specified by standards organizations, e.g., National Institute of Standards and Technology (NIST) and International Organization for Standardization (ISO), using topic modeling. The topic modeling performs natural language processing (NLP) on categories and topic descriptions set forth in the framework, as well as natural language processing on the rules of an enterprise's STEM rules, to thereby align the enterprise's STEM rules with the various categories and topics in the framework. For example, the results of the NLP operations generate identified terms/phrases in the framework and STEM rules, and the alignment tools evaluate the degree of correspondence of terms/phrases in the STEM rules to terms/phrases in the categories and topics of the framework to generate alignment scores. Aggregation mechanisms, such as Principal Component Analysis (PCA) or the like, may be used to aggregate the alignment scores to reduce the amount of alignment scores considered down to a top n number of alignments, e.g., top 3 or the like. Thus, an alignment of rules to framework categories and topics is generated that can be used to identify which framework categories and topics are addressed by the rules in the STEM rule set used by the enterprise, as well as, for each rule, which of the categories and topics that rule addresses.

A similar alignment operation may be performed with regard to standard rule sets such as may be provided in standard rule repositories so as to identify which rules in the standard rule repositories may be used to improve the enterprise's SIEM rule set. That is, the rules in the enterprise's STEM rule set are aligned with the rules in the standard rules repository. Those that align well indicate that there is already a rule in the STEM rule set that performs a substantially similar functionality as to that of the standard rule in the standard rule repository. Those standard rules in the standard rules repository for which there is no adequate alignment with a rule in the SIEM rule set indicates that the standard rule may be a candidate for addition to the STEM rule set to thereby enhance the STEM rule set to include a rule to address a threat that may not already be adequately addressed by the existing rules in the SIEM rule set.

Thus, using the alignment mechanisms of the illustrative embodiments in the ARA, an enterprise may determine what categories and topics of a framework are covered by their SIEM rule set, e.g., if the framework has 15 topics, the alignment mechanisms of the illustrative embodiments may identify 13 of these topics as being aligned with rules in the enterprise's SIEM rule repository, but that 2 others of the topics do not have any substantial alignment to rules in the SIEM rule repository. Degrees of alignment may be associated with each of these categories/topics so as to determine how much the SIEM rule set aligns with each category/topic and threshold degrees of alignment may be established for determining when a category/topic is adequately covered by the SIEM rule set. This information may be output to the human analyst to thereby inform them of where additional efforts should be made to ensure that the SIEM rule repository addresses each of the topics specified in the framework.

Furthermore, using the alignment mechanisms of the illustrative embodiments, an enterprise may align their own SIEM rule set to a set of standard rules available in an organization's standard rules repository, such as the IBM Use Case Library. The standard rules repository comprises rules that have been determined to be of particular good performance against known threats and in some cases may also represent default rules that can be added to a plurality of enterprise SIEM rule sets as a default set of rules upon which the individual enterprises may generate their own SIEM rule sets. Based on the alignment, or non-alignment, of rules in the SIEM rule set with those in the standard rules, the human analyst is informed of standard rules that could be added to the enterprise's SIEM rule set to improve its coverage of various threats. The human analyst may then import or otherwise generate additional rules in the STEM rule set based on the alignment to the standard rules in the standard rule repository. In some illustrative embodiments, standard rules in the standard rules repository may be automatically imported in response to the degree of alignment being lower than a predetermined threshold amount of alignment.

In further aspects of the illustrative embodiments, the ARA provides mechanisms for decomposing rules into their constituent components, e.g., rule conditions, for use in generating new rules. The ARA trains a machine learning or cognitive computing system comprising machine learning mechanisms, such as a Recurrent Neural Network (RNN) or the like, to learn to generate new rules from threat characteristics and from various rule conditions available from STEM rule creation tools. That is, the ARA is trained using known threat characteristics and known rules with their corresponding conditions, to learn how human analysts compose rules to address threats, e.g., when these threat characteristics are present, human analysts uses these rule conditions to address those threat characteristics. Based on this learning, through a supervised machine learning process, the RNN is trained such that when given input threat characteristics and/or rule conditions that are satisfied by a threat, the RNN generates a new SIEM rule based on its machine learning, such that the new SIEM rule may be presented to a human analyst for consideration, editing, and deployment into an enterprise STEM rule set, or in some cases may be automatically deployed without human intervention.

In this way, the ARA may dynamically generate new STEM rules to address newly identified threats in less time than would otherwise be required by a human analyst to generate similar rules, and with less human effort, error, and the like. Even in the case of embodiments where the human analyst is involved in the deployment of the generated STEM rule, the ARA performs a large part of the work necessary to generate a new STEM rule such that the human analyst need only approve the new SIEM rule for deployment, or perform substantially less amount of work than would otherwise be needed in the manual process to edit the new STEM rule and deploy it.

It should be appreciated that while the illustrative embodiments described herein reference SIEM rules and security rule based computing environments, the illustrative embodiments may be applied to any rules and rule based computing environments, including other security rules and non-security rules, e.g., business rules or the like. SIEM rules are based off of events or flows from inline network devices throughout a network of a managed computing environment, e.g., events may be obtained from firewalls, servers, endpoints, and the like, and the SIEM rules are applied based on the activities happening throughout the network. Other types of security rules are also inline or are associated with span/tap ports and look at packet level datagrams and take actions based on packet signatures or heuristics. Business rules based computing mechanisms provide structured logic for controlling the operation or behavior of a business by describing the operations, definitions, and constraints that apply to the organization, such that the rules may be applied by appropriate computing systems to control interactions of processes and the flow of data in the computing environment. In any of these cases, the mechanism of the illustrative embodiments described herein may be implemented to perform rule management and generation, and in some illustrative embodiments may be implemented with regard specifically to SIEM rules, as will be assumed in the following description for purposes of illustration. Thus, in general, references to SIEM rules hereafter may also be considered to reference other types of security rules, or rules used in other computing environments, in other illustrative embodiments.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an example diagram illustrating the interaction of the Advanced Rule Analyzer (ARA) with a variety of computing systems to perform rule similarity, rule decomposition, and rule alignment, rule generation, and rule management operations in accordance with one illustrative embodiment. As shown in FIG. 1, the ARA 100 comprises a parsing and natural language processing engine 102, a similarity determination engine 104, a rule similarity visualization engine 106, a rule deduplication and merging engine 108, a rule alignment engine 110, a rule decomposition engine 120, and a rule generation engine 122. These components of the ARA 100 may be implemented as special purpose computer hardware units, software executing on computer hardware so as to configure the computer hardware to perform operations attributed to the particular component, or any combination of special purpose computer hardware units and software executing on computer hardware. It should be appreciated that other components for performing execution of instructions, processing of data, and communication with other computing systems are also provided in the ARA 100, but for simplicity of the depiction in FIG. 1, are not explicitly shown. For example, the ARA 100 may utilize various communication interfaces, application programming interfaces (APIs), scripts, internal memory data structures, and the like, to facilitate the operations of the depicted elements.

As shown in FIG. 1, the ARA receives inputs from a variety of different sources of SIEM rule information including, but not limited to:

a) multiple STEM tools (such as QRadar, ArcSight, Splunk, or the like) 190;

b) log sources 180;

c) an enterprise (client) computing environment 130 comprising a security operations center (SOC) or other STEM rules execution and management computing device 132;

d) security control frameworks or standards (such as those available from NIST, ISO, or the like) source computing systems 140;

e) standard rules repositories 150, such as the IBM Use Case Library or the like which provides rule definitions, thresholds and the like;

f) threat intelligence feeds (such as X-Force, Xchange, or the like) source computing devices 160; and g) other external source computing devices 170 providing sources of attack or threat information (such as Mitre ATT&CK models, NVC CVE database, and the like).

The ARA uses natural language processing (NLP) techniques, statistical analysis, similarity analysis, topic modeling, principal component analysis (PCA), and rule visualization on the STEM rules information, threat intelligence information, log source information, framework information, and the like, obtained from these various sources to identify and eliminate duplicate rules, combine similar rules together into "super rules," align STEM rules with frameworks and/or standard rules from standard rules repositories, decompose the rules and their conditions into principal components for use in automatically generating new STEM rules, and train a machine learning model, such as a Recurrent Neural Network (RNN), to generate automated rules based on specific threat intelligence and learning of rule components that correspond to threat characteristics.

With regard to identifying and eliminating duplicate STEM rules, the parse and NLP engine 102 and similarity determination engine 104 of the ARA operate to parse SIEM rule logic, tokenize strings in the content of the rules, and evaluate similarity between the SIEM rules. That is, in one illustrative embodiment, the ARA 100 receives SIEM rules exported from the enterprise computing environment 130 in a structured format, such as an Extensible Markup Language (XML) document, a comma separated values (CSV) formatted file, JavaScript Object Notation (JSON) formatted file, or other structured format data structure. For example, APIs, scripts, or other interfaces executing in the enterprise environment 130 and/or the ARA 100 may be utilized to communicate with the SOC 132 and have the SOC 132 export the SIEM rules set 134 utilized by the SOC 132 in a structure format data structure to the ARA 100 for processing. FIG. 2 is an example diagram of an XML formatted document data structure corresponding to a portion of a SIEM rule set which may be received by the ARA 100 for processing.

It should be appreciated that in some illustrative embodiments, the SIEM rule set need not be provided in a structured format, but instead may be provided in a non-structured format such that natural language processing (NLP) operations may be performed on the non-structured format STEM rule set data structure to identify specific instances of text strings, e.g., terms/phrases, and the like, that appear in the non-structured format. The NLP operations then correlate such identified text strings with concepts specific to the SIEM rules domain, or other domain depending on the implementation, e.g., in embodiments where the mechanisms are applied to business rules of another nature. For purposes of the present description, since known SOCs utilized structured rule sets, it will be assumed that the SIEM rule set data structure 134 is provided in a structured format.

The parse and NLP engine 102 parses the STEM rule set data structure 134 received from the enterprise computing environment 130 to extract the relevant features and format them for performance of natural language processing on the SIEM rules in the SIEM rule set data structure. For example, the parse and NLP engine 102 may parse the STEM rule set data structure based on tags present in the structure of the data structure, e.g., XML document, to identify corresponding portions of STEM rules present in the data structure 134, such as the rule name, tests or criteria evaluated by the rule, whether the rule is enabled by the enterprise computing environment 130, rule identifier, notes, and the like.

FIG. 3 is an example diagram illustrating a parsed and reformatted version of the STEM rule set data structure shown in FIG. 2. As shown in FIG. 3, the STEM rules are reformatted into various characteristics of the corresponding SIEM rules, including a rule name, tests performed by the rule, and other features identified in the content of the rule definition in the SIEM rule data structure 134 identified via the parsing. In this example, the parser identifies XML tags in the XML formatted STEM rule set data structure 134 shown in FIG. 2 and extracts the corresponding text associated with those XML tags and maps it to the corresponding portions of the reformatted SIEM rule definition to generate the reformatted SIEM rule set structure shown in FIG. 3.

Having reformatted the SIEM rule data structure 134 to a STEM rule definition format more easily processed by the NLP operations, NLP logic of the parse and NLP engine 102 is applied to portions of the reformatted STEM rule data structure 134. For example, in some illustrative embodiments, it has been determined that the important portion of the STEM rule data structure 134 used to evaluate a STEM rule is the tests performed by the rule, which indicates the rule logic and what the rule is designed to do. Thus, for example, in FIG. 3, the NLP logic of the parse and NLP engine 102 is applied to the text for each SIEM rule that appears in the second column (labeled "tests").

The NLP logic is specifically configured, such as with dictionary data structures, synonym data structures, and the like, which are specific to the SIEM rules domain and thus, identifies terms/phrases, or other text strings, that are indicative of SIEM rule conditions or criteria and other features. The NLP logic breaks down the STEM rule definitions into corresponding "bag of words" representations of the STEM rule definitions, and then tokenizes the STEM rule definitions to generate a vector representation of the SIEM rule definitions such that statistical analysis of the STEM rule definitions can be performed. For example, a count vectorizer, or one-hot encoding, mechanism may be utilized to convert the identified portions of text into a vector representation, where each vector value corresponds to a recognizable portion of text in the vocabulary for the SIEM rules domain. If the recognizable portion of text appears in the STEM rule, the corresponding vector value is set to 1, if the recognizable portion of text does not appear in the SIEM rule, then the corresponding vector value remains 0. In some implementations, the vector value may actually represent a number of instances of the corresponding portion of text appearing in the SIEM rule.

In some illustrative embodiments, the similarity engine 104 of the ARA 100 uses various statistical analysis on the vector representations of the various SIEM rules present in the SIEM rules data structure 134, such as term frequency (TF)-inverse document frequency (IDF) algorithms, cosine similarity natural language processing algorithms, and the like, to establish measures of similarity between STEM rules. The TF-IDF is a numerical statistic that is intended to reflect how important a portion of text, e.g., a word, phrase, or other tokenized portion of text, is to a document (where the "document" in the context of the present invention is a STEM rule definition) in a collection or corpus of documents (where the "collection" in the context of the present invention is a STEM rule set or plurality of SIEM rule sets). The TF-IDF increases proportionally to the number of times the portion of text appears in the document, but is offset by the frequency of the portion of text in the corpus, which helps to adjust for the fact that some text appears more frequently in general. Cosine similarity is a measure of similarity between two non-zero vectors of an inner product space that measures the cosine of the angle between them, e.g., a cosine of 0 degrees is 1 and it is less than 1 for any other angle. With cosine similarity, the resulting similarity ranges from −1 meaning the exact opposite, to 1 meaning exactly the same, with 0 indicating orthogonally (decorrelation), and in-between values indicating intermediate similarity or dissimilarity. It should be appreciated that TF-IDF and cosine similarity are only used as examples of the statistical analysis that may be performed by the similarity engine 104 to identify similarities between SIEM rules, and other statistical measures of similarity using various statistical algorithms may be used without departing from the spirit and scope of the illustrative embodiments.

Using such statistical measures, the similarity engine 104 may evaluate the SIEM rule set data structure, such as the STEM rule set data structure 134 in FIG. 1, and identify the portions of text that are statistically significant in the STEM rule set, e.g., using term frequency, inverse document frequency, and/or term frequency-inverse document frequency statistical measures. These measures may be used to assign a significance measure for each term in the vocabulary which is represented as a vector with vector values for each term in the vocabulary, and the vector terms being set to values corresponding to the significance measure. Having identified the statistically significant portions of text in the SIEM rule set data structure 134 and generated the vector representations, each of the STEM rules in the SIEM rule set data structure 134 is paired with another SIEM rule in the STEM rule set data structure 134 and a similarity analysis is performed on the pairing based on the statistically significant portions of text, e.g., a cosine similarity on the vector representations of the paired rules with regard to the statistically significant portions of text. The similarity engine 104 generates, for each pairing of STEM rules, a corresponding similarity score value indicating how similar the paired STEM rules are to one another based on the particular conditions specified in the test portion of the SIEM rule definitions, such as by using the cosine similarity evaluation of the corresponding vector representations.

Based on the identification of statistically significant portions of text, and measures of similarity between STEM rules with regard to these statistically significant portions of text, the similarity engine 104 of the ARA 100 identifies SIEM rules that are duplicates of each other and those that are significantly similar such that they may be candidates for merging of the STEM rules. The statistical measures of significance of portions of text as well as measures of similarity may be presented to human analysts for review via the similarity visualization engine 106. That is, the similarity visualization engine 106 comprises logic that takes the results of the statistical analysis performed by the similarity engine 104 and generates one or more graphical user interface visualizations detailing the statistical significance of portions of text of SIEM rules and the similarity measures of STEM rules.

FIG. 4 is an example diagram of a portion of a graphical user interface in which statistically significant portions of text present in the test portion of a SIEM rule definition are represented along with their statistical measures of significance. In FIG. 4, a first column 410 provides the rule name and a second column 420 represents the token stem, i.e. the significant portion of text. The third column 430 represents the number n of instances of the corresponding token stem in column 420 found in the corresponding SIEM rule specified in column 410. The fourth column 440 presents the term frequency (tf) statistical measure, the fifth column 450 presents the inverse document frequency (idf) statistical measure, and the sixth column 460 presents the tf-idf statistical measure for the corresponding token stem in column 420, and for the rule specified in column 410 of the entry 400. The information presented in these columns is obtained from the parsing and NLP operations performed by the parsing and NLP engine 102 and the statistical measures generated by the similarity engine 104. The portion of the graphical representation may be sortable through user selection, with regard to any of the columns, such as sorting by increasing/decreasing tf-idf, sorting by token stem in alphabetical order, sorting by rule name in alphabetical order, or the like.

FIG. 5 is an example diagram of a portion of a graphical user interface in which similarity scores are represented with regard to pairings of rules in a SIEM rule set data structure, such as SIEM rule set data structure 134 in FIG. 1. As shown in FIG. 5, the portion of the graphical user interface depicted comprises a first column 510 in which a first rule name of a first rule in the pairing is indicated, a second column 520 in which a second rule name for a second rule in the pairing is indicated, and a third column 530 showing the similarity score value calculated for the two rules specified in columns 510 and 520 for the particular entry 500. In the depicted example, the similarity score value in column 530 is calculated using a cosine similarity algorithm applied to vector representations of the SIEM rules specified in columns 510 and 520. Again, the columns are sortable through user interactions with the graphical user interface to sort the entries 500 according to ascending/descending numerical order, alphabetical order, or any other sorting criteria.

It can be appreciated that the listing of pairings of SIEM rules may be quite extensive as the size of the STEM rule set is increased. For example, for a SIEM rule set having 200 STEM rules, each rule is paired with each of the other 199 SIEM rules and corresponding similarity scores are generated such that each may be represented in the portion of the graphical user interface shown in FIG. 5. Thus, it may be quite unwieldy to identify duplicate and/or substantially similar STEM rules using a listing such as shown in FIG. 5. While exact duplicates will have a similarity score of 1 and thus, may be identifiable by a human analyst via the visualization shown in FIG. 5, other significantly similar STEM rules may be less easy to identify. Of course, a sort on column 530 for similarity scores of descending order may make this easier, however it may still be a daunting task depending on how large the STEM rule set is.

Furthermore, in some illustrative embodiments, the comparison and identification of similarities between SIEM rules may be extended to other STEM rule sets. That is, rather than analyzing only the SIEM rules in a single STEM rule set data structure 134, in other embodiments, the SIEM rule comparison and similarity analysis may be performed across multiple STEM rule sets from the same or different enterprises. This may greatly increase the number of pairings of STEM rules that are subject to the similarity analysis making the visualization in FIG. 5 even more difficult to use to identify duplicate and/or substantially similar SIEM rules.

Figure 6:
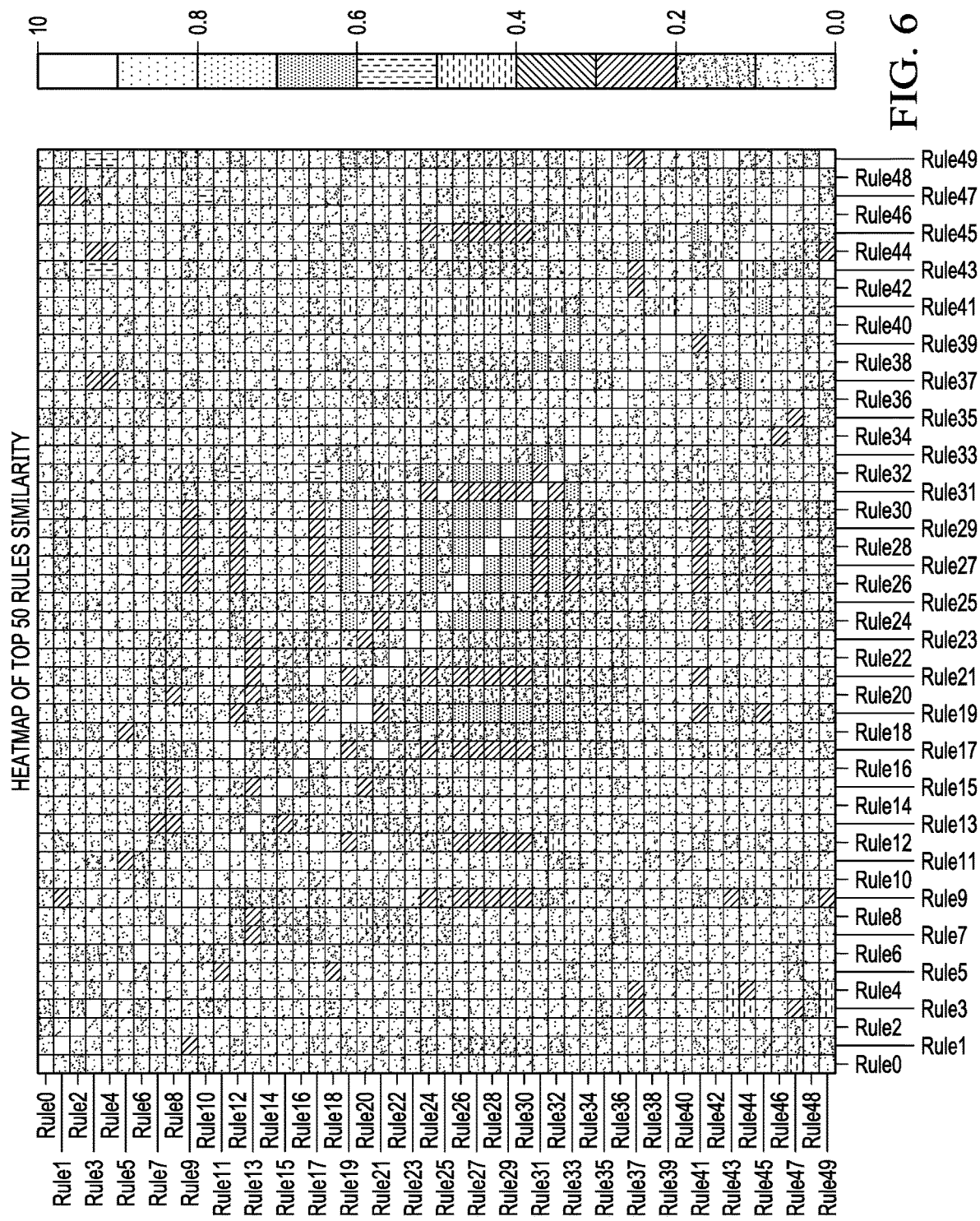
FIG. 6 is an example diagram of a heat map visualization of the similarity scores between pairs of rules in accordance with one illustrative embodiment.

FIG. 6 is an example diagram of a heat map visualization of the similarity scores between pairs of rules in accordance with one illustrative embodiment. The visualization in FIG. 6 may also be generated by the similarity visualization engine 106 for presentation to a human analyst in order to graphically depict the similarities between SIEM rules for potential deduplication and/or merging of similar rules. In the visualization shown in FIG. 6, different levels of similarity, i.e. different ranges of similarity scores or measures, correspond to different shades or colors of pixels in the visualization. Thus, by looking at the visualization in FIG. 6, a human analyst can more easily have their attention drawn to rule pairings that indicate duplicate and/or significantly similar rules.

In the visualization of FIG. 6, one of the STEM rules in a pairing is represented on the horizontal axis and the other of the STEM rules in the pairing is represented on the vertical axis. The intersection of these rules on the axes is a colored set of pixels whose color or shading represents the level of similarity between the two STEM rules. The diagonal white line represents the pairing of a rule to itself, thus indicating an exact copy of the rule and a similarity score of 1, while pairings of SIEM rules that are completely different from one another are represented as black pixels, i.e. a similarity score of 0. All other levels of similarity in the depicted example are represented as different colors or shades ranging between white and black, with lighter shades representing higher levels of similarity. Thus, a human analyst viewing the heat map visualization of FIG. 6 has their attention brought to the lighter shaded portions of the visualization and can then quickly identify the corresponding rule pairings so that the human analyst can investigate further whether the rules should be deduplicated, e.g., removal of all but one copy of the rule, or merged into a "super rule." This may be done manually by the human analyst or through automated mechanisms as discussed hereafter.

In some illustrative embodiments, the similarity visualization engine 106 may present a user interface through which the human analyst can specify a SIEM rule of interest and a threshold level of similarity that the human analyst is interested in. That is, the human analyst, via the user interface, may specify that they wish to be informed of what other rules Y in the SIEM rule set are similar to a specified rule X at a minimum level of similarity Z. The similarity visualization engine 106 may then search the pairings of STEM rules to identify STEM rule pairings corresponding to the specified rule X and compare the corresponding similarity scores to the threshold similarity score Z specified in the user interface to identify those pairings having a similarity score that is equal to or greater than the specified threshold similarity score Z. The detailed information regarding the pairings that have a similarity score equal to or greater than the threshold Z may then be presented. In addition, any differences between the specified rule X and the other rule Y in the pairing, may be highlighted or otherwise accentuated in the visualization of the pairings so that the human analyst is informed of the other rules that meet the similarity score threshold criteria and is quickly informed of the differences in the similar rules such that the human analyst may more easily identify whether or not the rules should be deduplicated or merged into a single "super rule."

FIG. 7 is an example diagram illustrating a portion of a graphical user interface through which a user may specify criteria for identifying substantially similar STEM rules and obtain a visualization of the substantially similar STEM rules according to the user specified criteria. As shown in FIG. 7, a first portion 710 of the graphical user interface provides fields for entering a SIEM rule identifier, which in this case is a numerical value, and a threshold level of similarity, which in this case is specified as a percentage value. In this depicted example, the STEM rule set comprises 419 rules numbered 0 to 418 and thus, a user may specify a numerical value between 0 and 418 to specify a SIEM rule of interest to the user. In this example, the user also specifies a threshold level of similarity score needed for a pairing to be included in the results, e.g., 70% in this depicted example.

In a second portion 720 of the graphical user interface, a listing of the rules that are paired with the specified rule (e.g., rule 38 in the depicted example), and which have a similarity score equal to or above the threshold level of similarity score are represented. In the example shown in FIG. 7, the visualization of the graphical user interface includes entries 730 comprising a first column 732 specifying the rule identifier, e.g., numerical identifier of the STEM rule, a second column 734 specifying the corresponding rule name, a third column 736 comprising the text of the test portion of the STEM rule definition, such as may be obtained from the reformatted SIEM rule set data structure shown in FIG. 3, for example, and a fourth column 738 indicating the actual similarity score generated for the pairing of the rule with the rule of interest. As shown in FIG. 7, in the visualization, differences between the tests of the various similar rules may be highlighted in the visualization, e.g., portions 742 and 744 of rules 40 and 247 relative to the test text of rule 38, i.e. portion 740 in FIG. 7.

As noted above, in some illustrative embodiments, the rule deduplication and merging may be performed automatically by logic of the ARA 100 in order to generate a modified SIEM rule set data structure 136, which may be returned to the enterprise computing environment 130 for implementation by the SOC 132 in monitoring the various computing resources within the enterprise computing environment 130 and generating threat alerts in response to events. The rule deduplication and merging engine 108 provides logic for performing such automated SIEM rule deduplication and merging based on the similarity scores or measures associated with the pairings of STEM rules in the STEM rule set data structure 134. The rule deduplication and merging engine 108 may be configured to deduplicate pairings of SIEM rules that have a similarity score above a specified threshold similarity score (referred to as the deduplication threshold similarity score) indicating that the STEM rules are considered to be duplicates of one another. This threshold similarity score may be set to a relatively high value requiring exact or almost exact similarity between the SIEM rules, e.g., a similarity score of 1.0, 0.998, or the like. The particular threshold value chosen will depend on the desired implementation.

For those pairings of SIEM rules that have a similarity score that meet or exceed the deduplication threshold similarity score, deduplication is performed by removing all instances of the paired STEM rules except for a single SIEM rule such that only a single STEM rule from these pairings is maintained in the modified STEM rule set data structure 136. In cases where the deduplication threshold similarity score is less than 1.0, meaning that some measure of difference is permitted, any suitable determination as to which STEM rule to maintain may be used without departing from the spirit and scope of the present invention. For example, the selection may be performed randomly, the selection may be performed based on timestamps for creation times of the various SIEM rules, an evaluation of which SIEM rule would be more or less likely to generate false positive results, e.g., one which is more inclusive or less inclusive of events, etc.

With regard to merging of STEM rules, again the rule deduplication and merging engine may have a threshold similarity score specified indicating a minimum level of similarity required to consider pairings of SIEM rules for potential merging. Thus, pairings of SIEM rules that have a similarity score equal to or above this merge threshold similarity score, but less than the deduplication threshold similarity score, will be flagged for potential merging. The merge logic of the rule deduplication and merging engine may then operate on the pairings of SIEM rules to merge the differing portions of the SIEM rules together to form a "super rule." As can be appreciated, there may be multiple pairings with a target SIEM rule that meet the criteria of the merge threshold similarity score and thus, the merge may be performed with regard to a plurality of pairings such that more than two SIEM rules are merged together into a single super rule.

The actual merge operation may take many different forms. For example, in one illustrative embodiment, the differing portions of the tests of the similar rules may be concatenated together with logical operators linking the differing portions. As an example, taking the example shown in FIG. 7, and assuming a merge threshold similarity score of 0.90 meaning that the rules must be 90% similar or more, in the case of rules 38, 246, and 247 in FIG. 7, the differing portions 742 and 744 may be merged with the original portion 740 of rule 38 to form a super rule that comprises the test of rule 38 with the portion " . . . same identity MAC and different identity IP, or different identity Host Name, or different identity Net Bios Name, in 2 hours\r." Similarly, rather than using the "or" logical operator, depending on the nature of the different portions of the tests, other location operators may be utilized, e.g., "and", "not", or the like. The way in which to merge the differing portions of the rules may be learned using a neural network or other machine learning model that is trained to identify which logical operators to use to merge differing portions of the rules and/or which methodologies to use to perform the merge, e.g., concatenating the differing portions, such as conditions, thresholds, log sources, or clauses, or performing another type of merge operation based on other analysis, such as portions of the rules that result in false positives. The trained neural network or machine learning model may be implemented in the rule deduplication and merging engine 108 for automatic merging of substantially similar SIEM rules into super rules that are then used to replace the original STEM rules that were merged, in the modified SIEM rule set data structure 136 that is returned to the enterprise computing environment 130 for implementation by the SOC 132.

By removing duplicate rules and combining significantly similar rules, the SIEM rule set implemented by the SIEM tools of the SOC 132 and/or enterprise computing environment 130 is reduced automatically. The reduction in size with result in an improvement in the overall performance of the SIEM tools as they do not need to process a relatively larger rule set with duplicate or redundant rules, i.e. the SIEM rule set in data structure 136 is smaller in size than the SIEM rule set originally provided in data structure 134. Moreover, the reduction in size of the rule set will lead to fewer sources of false positive indicators, i.e. threat alert notifications, since fewer SIEM rules will be "firing" in response to the same event. This leads to fewer human resources being expended to investigate the various alerts.

As mentioned previously, in addition to SIEM rule deduplication and merging based on an evaluation of similarities between SIEM rules with regard to statistically significant portions of text in the SIEM rule definitions, the ARA 100 further provides mechanisms for aligning SIEM rules present in the received SIEM rule set data structure 134 to pre-defined frameworks, or standards, and/or standard SIEM rules specified in standard rules repositories. The alignment of the SIEM rules from the data structure 134 to the frameworks is to generate a report back to the human analyst associated with the enterprise computing environment 130 as to which classifications and/or topics specified in the frameworks are actually addressed by SIEM rules in the SIEM rule set defined in the data structure 134. The alignment of the SIEM rules from the data structure 134 to other standard SIEM rules, such as from a standard rules repository 150, is to identify standard SIEM rules that are present in the repository 150 that do not have corresponding SIEM rules in the SIEM rule set specified in the data structure 134, i.e. standard SIEM rules that may be added to the STEM rule set used by the enterprise computing environment 130 so as to address additional potential threats to the computing resources in the enterprise computing environment 130.

That is, as human analysts define new SIEM rules, well formulated rules or ones that are determined to work well to address threats, such as may be determined by a corresponding organization, may be added to a standard rules repository 150, such as the IBM Use Case Library (UCL) rules repository. While these are rules that a particular organization deems are well formulated to address particular threats, enterprises may define their own STEM rules that address similar threats or may define their own versions of these standard rules that they prefer to utilize. Thus, it is assumed that an enterprise will want to utilize their own STEM rules over standardized STEM rules when possible, but that in cases where the enterprise has not defined their own STEM rules for addressing threats, standard rules from a standard rules repository may provide assistance to enterprises in creating or importing rules to address threats and make their computing environments 130 more secure.

The rule alignment engine 110 of the ARA 100 provides logic that operates to align rules with frameworks, such as those specified by standards organizations, e.g., National Institute of Standards and Technology (NIST) and International Organization for Standardization (ISO), using topic modeling. The topic modeling performs natural language processing (NLP) on categories and topic descriptions set forth in the framework, as well as natural language processing on the rules of an enterprise's SIEM rule set, such as previously described above with regard to FIG. 3, to thereby align the enterprise's STEM rules with the various categories and topics in the framework. As such, the rule alignment engine 110 may be configured to utilize the results generated by the parse and NLP engine 102 with regard to the rules in the STEM rule set data structure 134, and may further provide NLP mechanisms for processing the textual descriptions presented in the framework definitions provided by the framework provider computing systems 140.

For example, the framework provider computing systems 140 may be associated with various standards organizations, such as NIST or ISO, and may provide data structures specifying the frameworks for protecting computing environments from potential threats such as malware, virus, and other types of attacks on computing resources. These data structures are provided in a structured format with the standards of the framework organized in terms of categories and topics with corresponding descriptions. FIG. 8 is an example diagram illustrating one arrangement of a framework definition in which categories and subcategories (or topics) are specified along with corresponding textual descriptions.

The rule alignment engine 110 performs natural language processing on the categories, topics (or subcategories), and their corresponding textual descriptions to again generate a vector representation of these categories and topics which can be used for topic and/or similarity analysis similar to that described above with regard to rule similarity evaluations. With regard to topic analysis, various statistical models may be utilized to perform topic analysis, such as Latent Dirichlet Allocation (LDA) or the like. Topic analysis using LDA is generally known in the art, descriptions and examples of which are provided by Susan Li, "Topic Modeling and Latent Dirichlet Allocation (LDA) in Python," Towards Data Science website, May 30, 2017, and at the KD Nuggets website, see "text mining 101 topic modeling"), and thus, a more detailed explanation is not provided herein.

With regard to similarity analysis, the vector representations of the categories and topics may be compared to the vector representations of the various STEM rules in the SIEM rule set data structure 134, as generated by the parse and NLP engine 102, to determine a measure of similarity between the categories and/or topics and the STEM rules. This measure of similarity may make use of the cosine similarity scores previously described above, however in other illustrative embodiments, the similarity may be simply a comparison of a number of times each statistically significant portion of text, e.g., a statistically significant term, appearing in the STEM rule also appears in the text associated with the category and/or topic. This assumes that a SIEM rule will be considered to be aligned with, and thus address threats categorized in, the categories and/or topics specified in the framework when the number of instances of statistically significant terms in the STEM rule appearing in the category/topic is equal to or above a predetermined threshold value. The same can be said about cosine similarity scores as well, i.e. a predetermined alignment threshold similarity score may be specified to indicate alignment.

The number of instances, or similarity scores, provide an alignment score for each pairing of a SIEM rule with a category/topic which can be compared to the alignment threshold value in order to identify alignments between STEM rules and categories/topics. In some illustrative embodiments, aggregation mechanisms are used to aggregate the alignment scores to reduce the amount of alignment scores considered down to a top n number of alignments, e.g., top 3 or the like. Thus, an alignment of rules to framework categories and topics is generated that can be used to identify which framework categories and topics are addressed by the rules in the SIEM rule set data structure 134 used by the enterprise computing environment 130, as well as, for each rule, which of the categories and topics that rule addresses. It should be appreciated that this process may be performed with regard to multiple different frameworks or with specific frameworks of interest selected by a user via a user interface, for example.

In addition to aligning the STEM rules from the data structure 134 with the frameworks, the rule alignment engine 110 may further align the STEM rules with standard rules retrieved from the standard rules repository 150, such as the IBM Use Case Library, for example. When aligning the STEM rules with the standard rules, a similar methodology is followed with the standard rule being put in place of the framework. Thereafter, however, the resulting alignment information for the standard rules is analyzed to identify standard rules in the repository 150 for which there is an insufficient amount of alignment by SIEM rules in the data structure 134. Those standard rules are then flagged as potential rules that could be added to the STEM rule set used by the enterprise computing environment 130 so as to address threats that do not appear to be sufficient covered by the STEM rule set used by the enterprise computing environment. These standard rules may then be reported to the human analyst associated with the enterprise computing environment 130 and/or automatically imported into the modified SIEM rule set data structure 136 returned to the SOC 132 for implementation in the enterprise computing environment 130.

Figure 9:
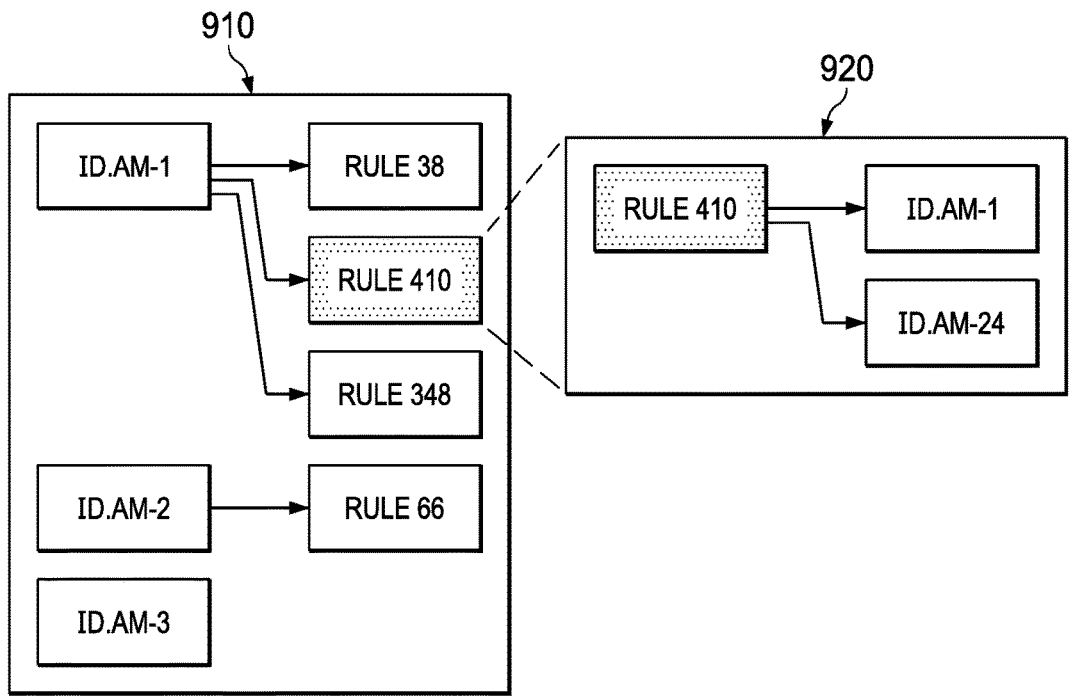
FIG. 9 is an example diagram illustrating a report that may be generated and returned to a human analyst based on the alignment performed by a rule alignment engine in accordance with one illustrative embodiment.

FIG. 9 is an example diagram illustrating a report that may be generated and returned to a human analyst associated with the enterprise computing environment 130 based on the alignment performed by the rule alignment engine 110. Such a report may be generated and presented to the human analyst as an additional portion of a visual representation in a graphical user interface generated by the similarity visualization engine 106, for example, or may be separate and distinct from these other visualizations previously described above. As shown in FIG. 9, in one illustrative embodiment, the report may comprise a listing 910 of framework categories/topics and the rule identifiers, rule names, or the like, that are in the STEM rule set and which have been determined to align with the particular category/topic, i.e. have a similarity score or amount of common statistically significant terms with the category/topic description that meets an alignment threshold. Those categories/topics for which there are no rule identifiers, rule names, or the like listed indicate categories/topics that are not covered by the enterprise's SIEM rule set.

The rule identifiers, rule names, or other designators of the rules may be user selectable such that the user may be presented with a subsequent user interface 920, such as in a pop-up window, separate window or user interface, or the like, identifying each of the categories/topics with which the rule has been determined to align. Thus, a human analyst using the graphical user interface can determine which rules are aligned to which categories/topics.

Using the alignment mechanisms of the rule alignment engine 110 of the ARA 100, an enterprise may determine what categories and topics of a framework are covered by their SIEM rule set 134. For example, in a framework having 15 topics, the rule alignment engine 110 may identify 13 of these topics as being aligned with rules in the enterprise's SIEM rule set 134, but that 2 others of the topics do not have any substantial alignment to rules in the SIEM rule set 134. Degrees of alignment may be associated with each of these categories/topics so as to determine how much the STEM rule set aligns with each category/topic and threshold degrees of alignment may be established for determining when a category/topic is adequately covered by the SIEM rule set. This information is viewable by the human analyst such that the information may be used to determine where additional efforts should be made to ensure that the SIEM rule set implemented by the SOC 132 in the enterprise computing environment 130 addresses each of the categories/topics specified in the framework(s) of interest.

Furthermore, the report shown in FIG. 9 may include a portion 930 that identifies the standard rules in the standard rules repository 150 that are candidates for inclusion in the SIEM rule set for the enterprise. As noted above, using the rule alignment engine 110 aligns the enterprise's STEM rule set 134 to the set of standard rules available in an organization's standard rules repository 150. Based on the alignment, or non-alignment, of rules in the SIEM rule set 134 with those in the standard rules from the repository 150, the portion 930 of the report may present a listing of which standard rules did not have significantly aligned rules in the SIEM rule set 134 and thus, are candidates for including in the modified STEM rule set 136. The entries in the portion 930 may be user selectable such that in response to a human analyst selecting the corresponding entry in the portion 930 of the report, an operation may be initiated to automatically import the corresponding standard rule into the modified STEM rule set 136 that is returned to the SOC 132 for implementation in the enterprise computing environment 130. In some illustrative embodiments, standard rules in the standard rules repository may be automatically imported in response to the degree of alignment being lower than a predetermined threshold amount of alignment and the portion 930 of the report may be used to report which standard rules were in fact already automatically imported into the modified STEM rule set.

In further aspects of the illustrative embodiments, the ARA 100 comprises a rule decomposition engine 120 and rule generation engine 122 to provide logic that is configured to perform operations for generating new STEM rules in response to threat intelligence indicating new threats that may be potentially encountered by computing resources in the enterprise computing environment 130. The rule decomposition engine 120 comprises logic that imports rule conditions (flow, events, offense, behavior, common, etc.) from SIEM tools provider computing systems 190, i.e. organizations that provide STEM tools with corresponding user selectable rule conditions for defining SIEM rules. The rule decomposition engine 120 further receives log source information from log sources 180, such as log source types and functions from log source databases 180. Pattern detection and regular expressions regex) are used by the rule decomposition engine 120 to extract information from the rule logic specified in the rule conditions and the log source information from the log sources 180, to build a rule component database 126. Entries in the rule component database specify the correlations between log source information, such as log source type, log source name, functions performed, test conditions of the SIEM rules, and the like.

The rule generation engine 122 comprises a Recurrent Neural Network (RNN) 124 that is trained using a supervised machine learning operation, to learn, from threat intelligence feeds, such as from threat intelligence feed computing systems 160, e.g., Mitre ATT&CK databases, NVD CVEs, and the like, how to predict the rule components from the rule component database 126 to utilize to define a new STEM rule to address new threats. As the rule conditions, log sources, thresholds, and the like, are mapped against threat intel feeds and the RNN 124 is trained to understand these relationships, machine prediction, which generates sequences of components based on the RNN 124 learning temporal dynamic behavior, is performed by the RNN 124 such that the RNN 124 identifies the relevant components to assemble automatically, and the order in which to assemble them, against newly identified threat intel feeds.

FIG. 10A is an example diagram illustrating the STEM rules that may be provided by a STEM tools provider computing system 190 to the rule decomposition engine 120. The parse and NLP engine 102 of the ARA 100 may be employed by the rule decomposition engine 120 to parse and perform NLP operations on the STEM rules, or the "cleaned" or reformatted version of these SIEM rules, so as to extract the various conditions of the STEM rules, e.g., offense conditions, flow conditions, behavior conditions, event conditions, anomaly conditions, threshold conditions, and common conditions. Such conditions are typically used by analysts to manually create rules combining them with thresholds, clauses, log sources, etc. These conditions are compared and used to train a machine learning model to create new rules.

Similarly, log source information obtained from the log source 180 is parsed and features extracted indicating log source information such as log source name, log source type, etc. This information may be mapped to the extracted conditions, such as by matching terms in the extracted conditions with terms corresponding to the log source name, type, etc., so as to generate rule component database 126 which specifies the various condition components used to define SIEM rules, the various log source components used to define SIEM rules, threshold components, and the like. That is, similar to the way in which terms from condition statements are matched between rules, log sources and their types are also matched to the log source reference appearing the rule logic. For example, if rule x has 2 log sources—Juniper firewall and checkpoint firewall—a search for these terms in the rule logic is performed and establishes a match when it is present. Thus, a table data structure is generated that identifies that rule x has 2 log sources—Juniper, Checkpoint. Thus, every rule is broken down into components representing log sources, conditions, thresholds, etc. FIGS. 10B and 10C shows portions of log source information (FIG. 10B) and mapping of log source with tests of STEM rules (FIG. 10C).

The RNN 124 is trained through a supervised machine learning training operation, to identify these components from the rule component database 126 which may be combined, and the sequence of such combination, to generate a SIEM rule to address particular types of threats. For example, assume a training data set comprising SIEM rules, defined in terms of a sequence of SIEM rule components, and corresponding threat characteristics. The RNN 124 is trained using this training data set such that for a given set of threat characteristics, the RNN 124 will generate a sequence of SIEM rule components to define a SIEM rule to address the threat. The output of the RNN 124 is then evaluated, i.e. the SIEM rule components generated by the RNN 124 are compared to the STEM rule components, as well as the sequence, of the "ground truth" of the training set to determine similarities and differences, i.e. an error or loss in the RNN 124 output. Based on these similarities and differences, the hidden layers of the RNN 124 have their operational parameters, e.g., weights and the like, adjusted to attempt to minimize the error in the output generated by the RNN 124. Linear and/or logistic regression mechanisms may be used to adjust the operational parameters of the hidden layers.

This process is performed in an iterative manner until a convergence of the RNN 124 is achieved and the error is less than a predetermined threshold. Because the RNN 124 includes the ability to track patterns with regard to a temporal aspect, the RNN 124 can not only learn the particular STEM rule components to utilize, but the particular sequence of these STEM rule components, leading to an output of a sequence of SIEM rule components that together constitute a new STEM rule definition to address the threat characteristics.

Figure 11:
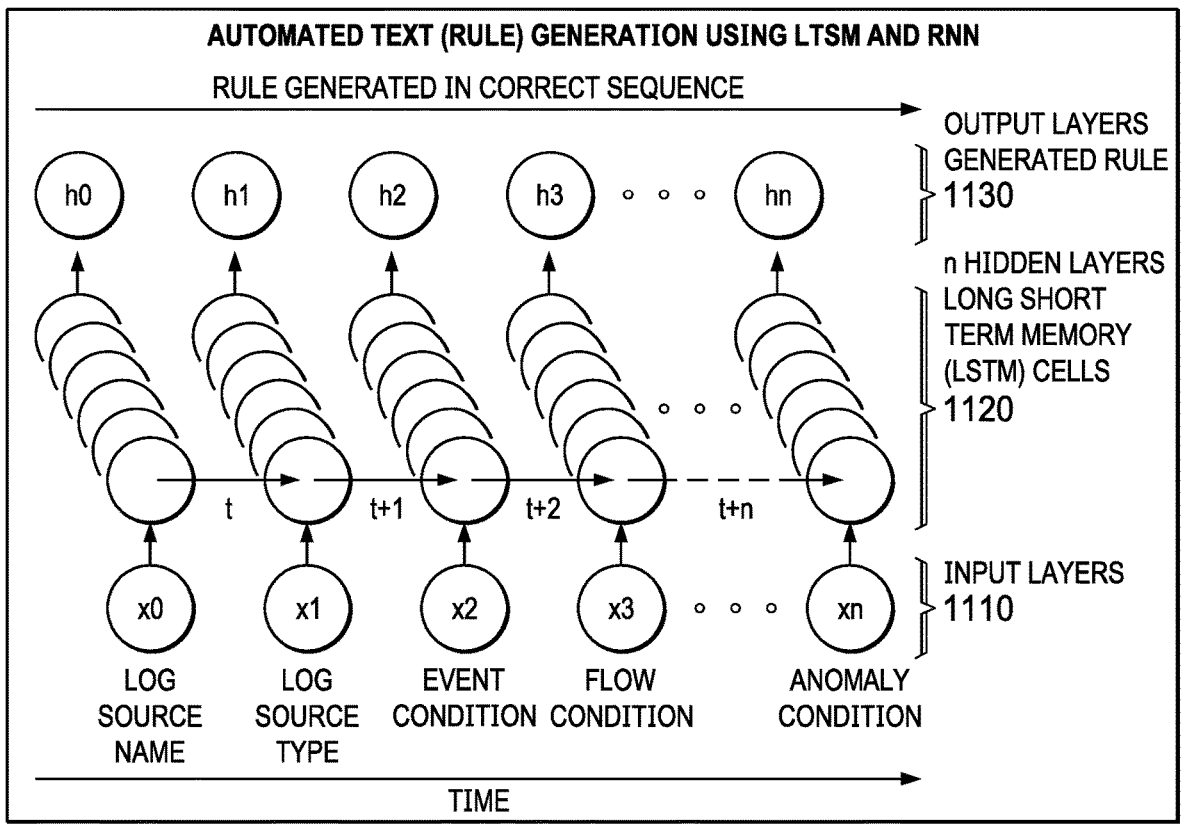
FIG. 11 is an example diagram of an RNN that may be implemented as part of a rule generation engine in accordance with one illustrative embodiment.

FIG. 11 is an example diagram of an RNN that may be implemented as part of the rule generation engine in accordance with one illustrative embodiment. As shown in FIG. 11, the RNN is comprise of an input layer 1110, one or more hidden layers 1120 comprising long short term memory (LSTM) cells, and an output layer 1130. As shown in FIG. 11, the LSTM cells of the hidden layers maintain a temporal sequence t, t+1, t+2, etc. such that they may identify a sequence of STEM rule components for output by the output layer 1130. The input layer 1110 receives as input threat indicators/vectors and rule logic to thereby learn associations of threat indicators/vectors as "questions" and rule logic as "answers" to these questions. In this way, through machine learning, the RNN learns how to combine different constructs, e.g., terms and rule components, e.g., conditions, thresholds, etc. to generate rules.

The hidden, or intermediate layers, are comprised of LSTM cells that each perform a corresponding function on the inputs that the LSTM cell receives from the input layer 1110 or LSTM cells of another hidden layer. Weights are associated with the LSTM cells which may be adjusted during training so as to cause different LSTM cells to be weighted more heavily than others and thereby influence the output generated by the RNN in response to particular inputs. The output layer comprises nodes that output the particular SIEM rule components that the hidden layers determine are appropriate for addressing the input threat characteristics, with these SIEM rule components being output in a sequential order to define the SIEM rule.

Once trained to correlate input threat characteristics with output SIEM rule components, when the RNN 124 is presented with new threat characteristics, such as may be identified from parsing and NLP performed on threat intelligence feeds from the threat intelligence feed computing systems 160 or external source computing systems 170, the RNN 124 is able to automatically generate the correct combination of STEM rule components, and their sequence, that should be used to define a SIEM rule to address the new threat. The output from the RNN 124 may then be input to a template used by the rule generation engine 122 to convert the output of the RNN 124 into a text definition of the STEM rule's test, such as the test portion of the SIEM rule shown in FIG. 3, as discussed previously. The newly generated rule may then be deployed to the enterprise computing environment 130 as part of a modified SIEM rule set data structure 136, for example.

In this way, the ARA 100 may dynamically generate new STEM rules to address newly identified threats in less time than would otherwise be required by a human analyst to generate similar rules, and with less human effort, error, and the like. For example, it may take a human analyst 20 or more hours to generate a new STEM rule, and this time may be shortened to a fraction of this time. Even in the case of embodiments where the human analyst is involved in the deployment of the newly generated SIEM rule, the ARA 100 performs a large part of the work necessary to generate a new STEM rule such that the human analyst need only approve the new SIEM rule for deployment, or perform substantially less work than would otherwise be needed in the manual process to edit the new STEM rule and deploy it to the enterprise computing environment 130.

It should be appreciated that the operation of the ARA 100 to perform the above described operations with regard to rule deduplication and merging, alignment of rules to frameworks and/or standard rule sets, and/or generation of new rules to address new threats, may be performed in a continuous or periodic manner, in response to an event, or in response to a request to perform its actions, such as a human analyst at an enterprise computing environment 130 requesting the functionality of the ARA 100, such as in the case of the ARA 100 being provided as a cloud service or the like, for example. For example, the ARA 100 may perform its operations in response to new rules being added to the enterprise's SIEM rule set, in response to a human analyst's request to the ARA 100 to perform its functions, in response to the expiration of a predetermined time period, in response to a new threat information being received by the ARA, in response to a new standard rule being added to the standard rules repository 150, or any other trigger event, request, or condition.

Thus, with the mechanisms of the illustrative embodiments, an improved computer tool is provided that provides automated SIEM rule analysis to identify duplicate SIEM rules present in an enterprise's SIEM rule set and then perform deduplication and merging of SIEM rules so as to reduce the STEM rule set and thereby reduce processing time and false positive processing at the enterprise computing environment. Moreover, the illustrative embodiments provide similarity visualization functionality that presents rule similarity information in a manner that can be easily ingested by human analysts to understand the overlap of their STEM rules and the significance of such overlap. Furthermore, the illustrative embodiments provide mechanisms to align an enterprise's STEM rules with established frameworks and with standard rules repositories so as to identify areas where the STEM rule set of the enterprise may be improved. Furthermore, the illustrative embodiments provide mechanisms for automatically generating new STEM rules in response to newly identified threats on a dynamic basis.

Figure 12:
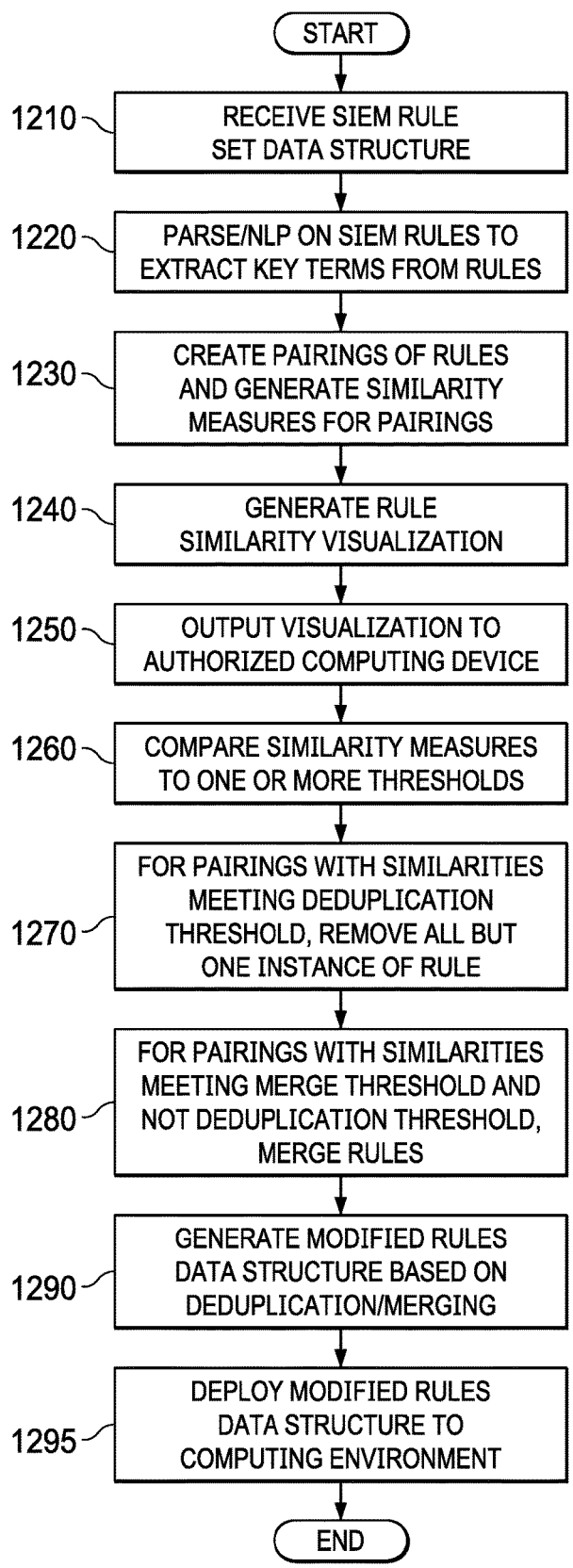
FIG. 12 is an example flowchart outlining an example operation of the ARA with regard to performing security rule deduplication and merging in accordance with one illustrative embodiment.

FIG. 12 is an example flowchart outlining an example operation of the ARA with regard to performing STEM rule deduplication and merging in accordance with one illustrative embodiment. As shown in FIG. 12, the operation starts by receiving a SIEM rule set data structure from a computing environment for evaluation of the SIEM rules being utilized by the computing environment (step 1210). The SIEM rules in the SIEM rule set data structure are parsed and natural language processing is performed on the SIEM rules to extract the key terms from portions of the SIEM rule, such as the definitions of the tests performed by the SIEM rule (step 1220). Pairings of SIEM rules with each other SIEM rule in the SIEM rule set data structure are created and similarity measures are generated, based on the key terms extracted from each SIEM rule, for each pairing indicating the statistical similarity between each SIEM rule in the pairing (step 1230). A SIEM rule similarity visualization output is generated that depicts the similarities between pairs of SIEM rules in a listing and/or graphical manner (step 1240). The visualization output may be provided to an authorized user, such as a system administrator or the like associated with the computing environment, so that decisions regarding SIEM rule deduplication and/or merging may be performed by the authorized user (step 1250). In some illustrative embodiments, the visualization output may include a portion similar to the listing shown in FIG. 7 described previously. In some illustrative embodiments, the visualization output may include a portion similar to the heat map of FIG. 6 described above, or other graphical representation of similarity between pairings of SIEM rules.

In some illustrative embodiments, the operation may terminate at this point with the outputting of the visualization. In other illustrative embodiments, the visualization output may provide graphical user interface elements through which the authorized user may specify which SIEM rules to deduplicate and/or merge, and thereby initiate such deduplication and merging of SIEM rules. In some illustrative embodiments, the deduplication/merging may be performed automatically without requiring user intervention to select SIEM rules and/or authorize deduplication/merging. In the depicted example of FIG. 12, an automated deduplication/merging is performed.

Thus, as shown in FIG. 12, the similarity measures are compared to one or more threshold values indicating threshold levels or degrees of similarity for deduplication and/or merging of STEM rules (step 1260). For those pairings whose similarity measures meet or exceed the deduplication threshold value, all but one of the SIEM rules are removed from the STEM rule set data structure in order to remove duplicate SIEM rules (step 1270). For those pairings whose similarity measures meet or exceed a merge threshold value, but are less than the deduplication threshold value, a merge operation is performed to merge elements of the paired STEM rules using logical operators, as previously discussed above (step 1280). The deduplicated/merged SIEM rules are used to modify the original STEM rule set data structure to generate a modified SIEM rules data structure (step 1290). The modified STEM rules data structure is returned to the computing environment for deployment and utilization in monitoring and managing security incidents and events (step 1295). The operation then terminates.

Figure 13:
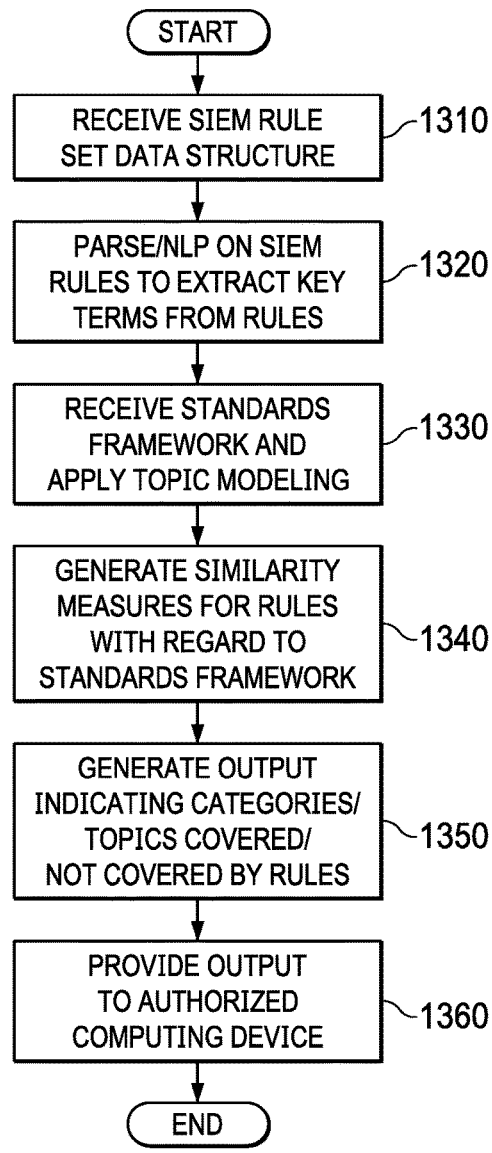
FIG. 13 is a flowchart outlining an example operation of the ARA with regard to performing rule alignment with frameworks and standard rules repositories in accordance with one illustrative embodiment.

FIG. 13 is a flowchart outlining an example operation of the ARA with regard to performing rule alignment with frameworks and standard rules repositories in accordance with one illustrative embodiment. As shown in FIG. 13, the operation starts by receiving a STEM rule set data structure from a computing environment for evaluation of the SIEM rules being utilized by the computing environment (step 1310). The STEM rules in the STEM rule set data structure are parsed and natural language processing is performed on the STEM rules to extract the key terms from portions of the STEM rule, such as the definitions of the tests performed by the STEM rule (step 1320). In addition, a standards framework is received from a standards organization computing system and topic modeling is applied to the standards framework to identify categories and/or topics of the standards framework and corresponding key terms associated with the categories and/or topics (step 1330). A similarity measure is generated for each SIEM rule in the SIEM rule set data structure indicating a similarity of the SIEM rule with categories and/or topics of the standards framework (step 1340). An output is generated indicating which categories and/or topics of the standards framework have SIEM rules in the SIEM rule set data structure that have a similarity measure equal to or above a predetermined threshold similarity value, and which categories and/or topics of the standards framework do not have SIEM rules in the SIEM rule set data structure that have a similarity measure equal to or above the predetermined threshold similarity value (step 1350). Thus, the output indicates which categories/topics are not adequately addressed by STEM rules in the STEM rule set data structure.

The output may be provided to an authorized user, such as a system administrator or the like associated with the computing environment, so that decisions regarding STEM rule generation may be performed by the authorized user (step 1360). The operation then terminates.

Figure 14:
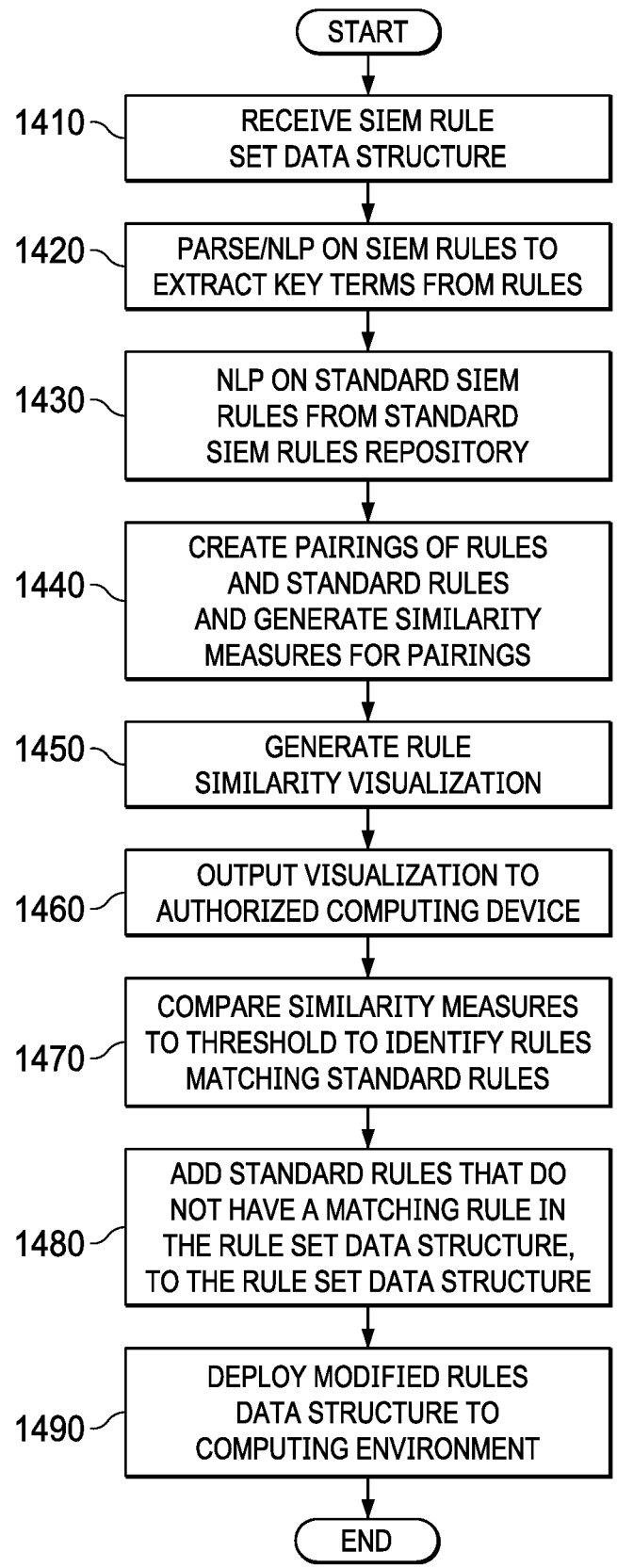
FIG. 14 is a flowchart outlining an example operation of the ARA with regard to automatic generation of new security rules in response to newly identified threats in accordance with one illustrative embodiment.

FIG. 14 is a flowchart outlining an example operation of the ARA with regard to automatic generation of new STEM rules in response to newly identified threats in accordance with one illustrative embodiment. As shown in FIG. 13, the operation starts by receiving a STEM rule set data structure from a computing environment for evaluation of the SIEM rules being utilized by the computing environment (step 1410). The STEM rules in the STEM rule set data structure are parsed and natural language processing is performed on the STEM rules to extract the key terms from portions of the STEM rule, such as the definitions of the tests performed by the STEM rule (step 1420). In addition, standard STEM rules in a standard STEM rules repository are processed using natural language processing to extract key terms associated with portions of the standard STEM rules, such as definitions of the tests performed by the STEM rule (step 1430). Pairings of SIEM rules from the received STEM rule set data structure with standard SIEM rules from the standard STEM rules repository are created and similarity measures are generated, based on the key terms extracted from each STEM rule and each standard SIEM rule in each pairing, where the similarity measures indicate the statistical similarity between the SIEM rule and the standard STEM rule in the pairing (step 1440). A STEM rule similarity visualization output is generated that depicts the similarities between pairs of SIEM rules and standard STEM rules in a listing and/or graphical manner (step 1450). The visualization output may be provided to an authorized user, such as a system administrator or the like associated with the computing environment, so that decisions regarding integration of standard SIEM rules from the standard SIEM rules repository into the SIEM rule set data structure may be performed by the authorized user (step 1460). In some illustrative embodiments, the visualization output may include a portion similar to the listing shown in FIG. 7 described previously. In some illustrative embodiments, the visualization output may include a portion similar to the heat map of FIG. 6 described above, or other graphical representation of similarity between pairings of SIEM rules and standard SIEM rules.

In some illustrative embodiments, the operation may terminate at this point with the outputting of the visualization. In other illustrative embodiments, the visualization output may provide graphical user interface elements through which the authorized user may specify which standard SIEM rules to integrate into the SIEM rule set data structure from the standard SIEM rules repository, and thereby initiate a modification of the SIEM rule set data structure. In some illustrative embodiments, the integration of standard SIEM rules from the standard SIEM rules repository, which do not have an existing SIEM rule in the SIEM rule set data structure with sufficient similarity (e.g., a threshold level of similarity), may be performed automatically without requiring user intervention. In the depicted example of FIG. 14, an automated integration of standard SIEM rules from the standard SIEM rules repository is performed.

Thus, as shown in FIG. 14, the similarity measures are compared to a predetermined threshold value indicating a threshold level or degree of similarity for integration of standard SIEM rules into the SIEM rule set data structure (step 1470). For those standard SIEM rules in the standard SIEM rule repository, that do not have a corresponding similarity measure with an existing SIEM rule in the SIEM rule set data structure that is equal to or above the predetermined threshold value, those standard SIEM rules are added to the SIEM rule set data structure to generate a modified SIEM rule set data structure (step 1480). The modified SIEM rules data structure is returned to the computing environment for deployment and utilization in monitoring and managing security incidents and events (step 1490). The operation then terminates.

Figure 15:
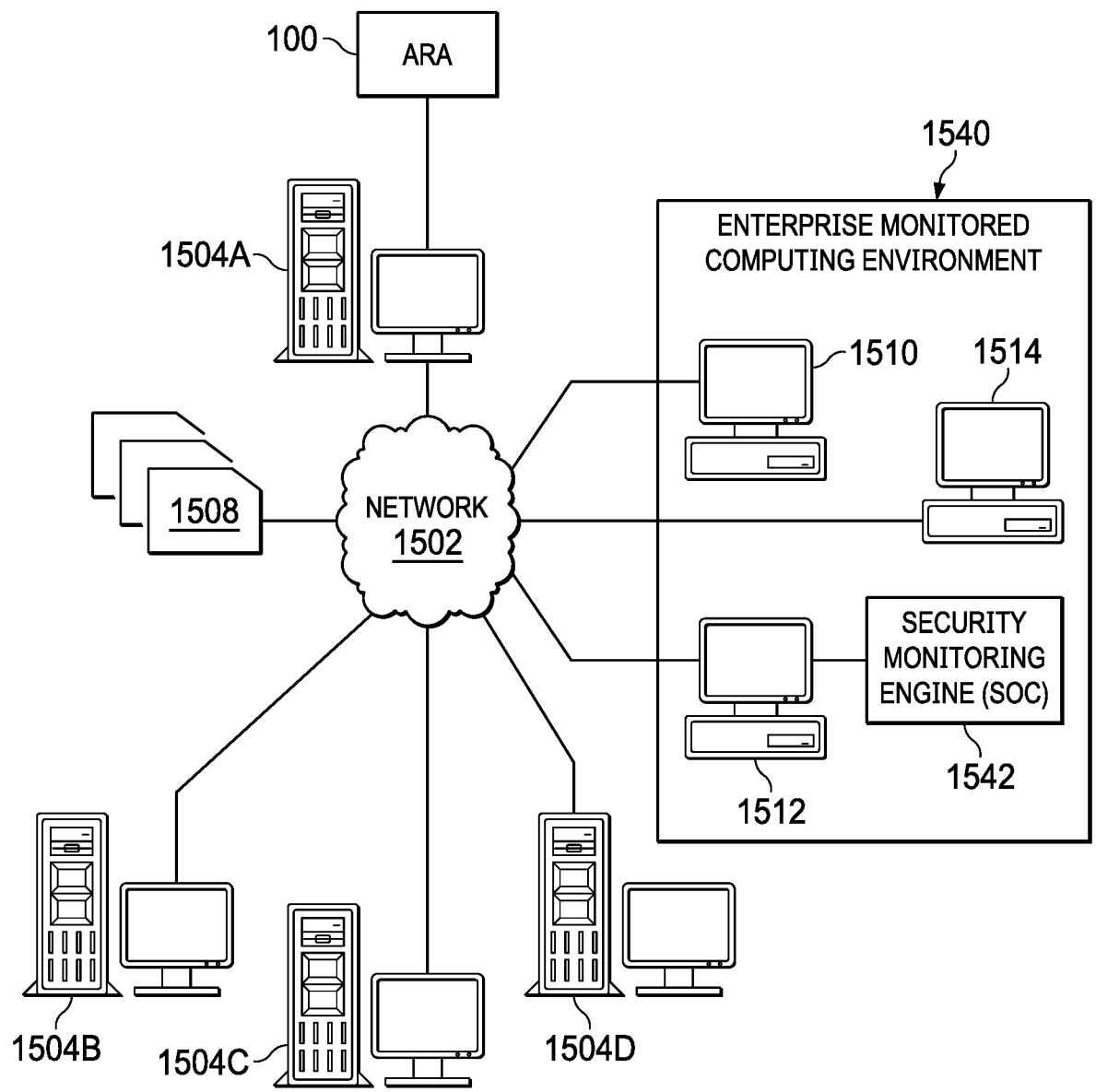
FIG. 15 is an example diagram of a distributed data processing system in which aspects of the illustrative embodiments may be implemented.

FIG. 15 depicts a pictorial representation of an example distributed data processing system in which aspects of the illustrative embodiments may be implemented. Distributed data processing system 1500 may include a network of computers in which aspects of the illustrative embodiments may be implemented. The distributed data processing system 1500 contains at least one network 1502, which is the medium used to provide communication links between various devices and computers connected together within distributed data processing system 1500. The network 1502 may include connections, such as wire, wireless communication links, or fiber optic cables.

In the depicted example, servers 1504A-D and server 1506 are connected to network 1502 along with storage units 1508, which may comprise content, such as log source information, threat intelligence information, standard rules repository, and the like, upon which the ARA 100 of the illustrative embodiments may operate. In addition, clients 1510, 1512, and 1514 are also connected to network 1502. These clients 1510, 1512, and 1514 may be, for example, personal computers, network computers, or the like. In the depicted example, servers 1504A-1504D provide data, applications, services, and the like, that are accessible by the clients 1510, 1512, and 1514. Distributed data processing system 1500 may include additional servers, clients, and other devices not shown, e.g., network routing or switching equipment, storage devices, and the like.

In the depicted example, distributed data processing system 1500 is the Internet with network 1502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 1500 may also be implemented to include a number of different types of networks, such as for example, an intranet, a local area network (LAN), a wide area network (WAN), or the like. As stated above, FIG. 15 is intended as an example, not as an architectural limitation for different embodiments of the present invention, and therefore, the particular elements shown in FIG. 15 should not be considered limiting with regard to the environments in which the illustrative embodiments of the present invention may be implemented.

As shown in FIG. 15, one or more of the computing devices, e.g., server 1504A, may be specifically configured to implement the Advanced Rule Analyzer (ARA) 100 of one or more of the illustrative embodiments previously described above. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 304, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, the implementation of the mechanisms of the illustrative embodiments improves the functionality of the computing device and provides a useful and concrete result that facilitates STEM rule management and automated STEM rule generation when necessary to address attacks/threats identified via cognitive evaluation of threat information sources.

As shown in FIG. 15, one or more of the client devices 1510-1514 may be associated with an enterprise computing environment 1540 and may represent computing resources of the monitored enterprise computing environment 1540. One or more computing devices of the monitored enterprise computing environment 1540, e.g., one of the client devices 1510-1514, a server 1504D, or the like, may execute a security monitoring engine of a SOC 1542 which applies SIEM rules to security events occurring with regard to the computing resources of the monitored computing environment 1540 to determine if the security events represent attacks/threats and if so, perform a corresponding action specified by the STEM rules, e.g., sending a notification, generating a log entry, blocking access, etc. The SOC 1542 may further interface with the ARA 100 executing on one or more other servers 1504A-C accessible via one or more data networks 1502, to have the ARA 100 perform its advance rule analysis operations as previously described above. The servers and data storage devices coupled to the data network(s) 1502 may provide various sources of input to the ARA 100 as described previously with regard to FIG. 1, so that the ARA 100 may perform its operations.

Figure 16:
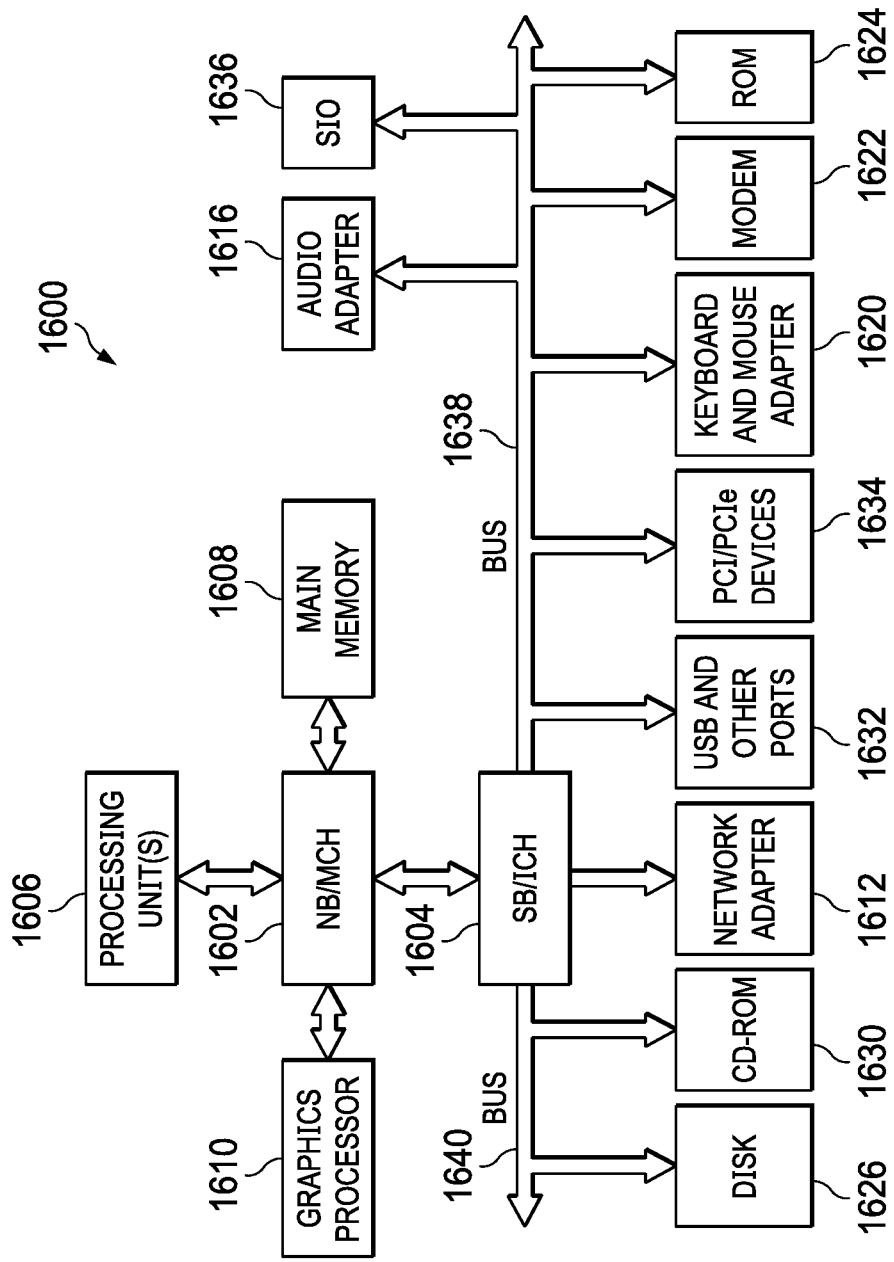
FIG. 16 is an example block diagram of a computing device in which aspects of the illustrative embodiments may be implemented.

As noted above, the mechanisms of the illustrative embodiments utilize specifically configured computing devices, or data processing systems, to perform the operations for SIEM rules management. These computing devices, or data processing systems, may comprise various hardware elements which are specifically configured, either through hardware configuration, software configuration, or a combination of hardware and software configuration, to implement one or more of the systems/subsystems described herein. FIG. 16 is a block diagram of just one example data processing system in which aspects of the illustrative embodiments may be implemented. Data processing system 1600 is an example of a computer, such as server 1504A in FIG. 15, in which computer usable code or instructions implementing the processes and aspects of the illustrative embodiments of the present invention may be located and/or executed so as to achieve the operation, output, and external effects of the illustrative embodiments as described herein.

In the depicted example, data processing system 1600 employs a hub architecture including north bridge and memory controller hub (NB/MCH) 1602 and south bridge and input/output (I/O) controller hub (SB/ICH) 1604. Processing unit 1606, main memory 1608, and graphics processor 1610 are connected to NB/MCH 1602. Graphics processor 1610 may be connected to NB/MCH 1602 through an accelerated graphics port (AGP).

In the depicted example, local area network (LAN) adapter 1612 connects to SB/ICH 1604. Audio adapter 1616, keyboard and mouse adapter 1620, modem 1622, read only memory (ROM) 1624, hard disk drive (HDD) 1626, CD-ROM drive 1630, universal serial bus (USB) ports and other communication ports 1632, and PCI/PCIe devices 1634 connect to SB/ICH 1604 through bus 1638 and bus 1640. PCI/PCIe devices may include, for example, Ethernet adapters, add-in cards, and PC cards for notebook computers. PCI uses a card bus controller, while PCIe does not. ROM 1624 may be, for example, a flash basic input/output system (BIOS).

HDD 1626 and CD-ROM drive 1630 connect to SB/ICH 1604 through bus 1640. HDD 1626 and CD-ROM drive 1630 may use, for example, an integrated drive electronics (IDE) or serial advanced technology attachment (SATA) interface. Super I/O (SIO) device 1636 may be connected to SB/ICH 1604.

An operating system runs on processing unit 1606. The operating system coordinates and provides control of various components within the data processing system 1600 in FIG. 16. As a client, the operating system may be a commercially available operating system such as Microsoft® Windows10®. An object-oriented programming system, such as the Java™ programming system, may run in conjunction with the operating system and provides calls to the operating system from Java™ programs or applications executing on data processing system 1600.

As a server, data processing system 1600 may be, for example, an IBM eServer™ System p® computer system, Power™ processor based computer system, or the like, running the Advanced Interactive Executive (AIX®) operating system or the LINUX® operating system. Data processing system 1600 may be a symmetric multiprocessor (SMP) system including a plurality of processors in processing unit 1606. Alternatively, a single processor system may be employed.

Instructions for the operating system, the object-oriented programming system, and applications or programs are located on storage devices, such as HDD 1626, and may be loaded into main memory 1608 for execution by processing unit 1606. The processes for illustrative embodiments of the present invention may be performed by processing unit 1606 using computer usable program code, which may be located in a memory such as, for example, main memory 1608, ROM 1624, or in one or more peripheral devices 1626 and 1630, for example.

A bus system, such as bus 1638 or bus 1640 as shown in FIG. 16, may be comprised of one or more buses. Of course, the bus system may be implemented using any type of communication fabric or architecture that provides for a transfer of data between different components or devices attached to the fabric or architecture. A communication unit, such as modem 1622 or network adapter 1612 of FIG. 16, may include one or more devices used to transmit and receive data. A memory may be, for example, main memory 1608, ROM 1624, or a cache such as found in NB/MCH 1602 in FIG. 16.

As mentioned above, in some illustrative embodiments the mechanisms of the illustrative embodiments may be implemented as application specific hardware, firmware, or the like, application software stored in a storage device, such as HDD 1626 and loaded into memory, such as main memory 1608, for executed by one or more hardware processors, such as processing unit 1606, or the like. As such, the computing device shown in FIG. 16 becomes specifically configured to implement the mechanisms of the illustrative embodiments and specifically configured to perform the operations and generate the outputs described herein with regard to the STEM rules management system.

Those of ordinary skill in the art will appreciate that the hardware in FIGS. 5 and 16 may vary depending on the implementation. Other internal hardware or peripheral devices, such as flash memory, equivalent non-volatile memory, or optical disk drives and the like, may be used in addition to or in place of the hardware depicted in FIGS. 15 and 16. Also, the processes of the illustrative embodiments may be applied to a multiprocessor data processing system, other than the SMP system mentioned previously, without departing from the spirit and scope of the present invention.

Moreover, the data processing system 1600 may take the form of any of a number of different data processing systems including client computing devices, server computing devices, a tablet computer, laptop computer, telephone or other communication device, a personal digital assistant (PDA), or the like. In some illustrative examples, data processing system 1600 may be a portable computing device that is configured with flash memory to provide non-volatile memory for storing operating system files and/or user-generated data, for example. Essentially, data processing system 1600 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions which are executed by the at least one processor and specifically configure the at least one processor to implement an advanced rule analyzer, the method comprising:

performing, by the advanced rule analyzer executing in the data processing system, natural language processing of a security rule set data structure, specifying a plurality of security rules, to identify textual descriptions of tests performed by each of the security rules in the security rule set data structure;

executing, by the advanced rule analyzer, for each security rule pairing comprising a pairing of a first security rule in a plurality of security rules with a second security rule in the plurality of security rules, a determination of a similarity measure indicating a degree of similarity of the textual description of the first security rule in the pairing with the textual description of the second security rule in the pairing, and in response to the security measure being equal to or above duplicate rule threshold value, eliminating one of the first security rule or the second security rule in the pairing from the security rule set data structure to generate a modified security rule set data structure;

deploying, by the advanced rule analyzer, the modified security rule set data structure to a computing environment for use in identifying security incidents and performing event management;

generating, by the advanced rule analyzer, a rule similarity visualization output comprising, for each security rule pairing, a correlation between the first security rule and the second security rule in the security rule pairing and a visual indicator of a degree of similarity between the first security rule and the second security rule in the security rule pairing; and outputting, by the advanced rule analyzer, the rule similarity visualization output to an authorized computing device for output to an authorized person associated with the computing environment, wherein the rule similarity visualization output comprises, for a selected security rule, a listing of one or more other security rules that have a similarity measure equal to or above a predetermined threshold similarity measure, wherein each entry in the listing comprises, for the corresponding other security rule, one or more characteristics of the corresponding other security rule comprising at least one of a rule identifier, rule name, tests performed by the corresponding other security rule, and a similarity measure for a security rule pair comprising the selected security rule and the other security rule.

2. The method of claim 1, wherein performing natural language processing on the security rule set data structure further comprises:

performing, for each security rule in the security rule set data structure, a statistical analysis of occurrences of terms in a test portion of the security rule to generate a vector representation of the security rule, wherein the vector representation comprises a plurality of vector values, each vector value being associated with a corresponding term in a recognized vocabulary, and wherein each vector value is set to a value corresponding to a statistical significance of a corresponding term based on results of the statistical analysis.

3. The method of claim 1, further comprising, for each security rule pairing:

performing, by the advanced rule analyzer, merge analysis on the similarity measure associated with the security rule pairing to determine if the similarity measure of the security rule pairing is equal to or greater than a merge threshold value; and in response to the similarity measure associated with the security rule pairing being equal to or greater than the merge threshold value, performing, by the advanced rule analyzer, security rule merging to replace the first security rule and the second security rule in the security rule pairing with a replacement security rule comprising elements of both the first security rule and the second security rule.

4. The method of claim 1, wherein the rule similarity visualization output comprises a heat map visualization in which visual characteristics of regions of the heat map visualization corresponding to security rule pairs represent degrees of similarity between the first security rule and the second security rule of the security rule pair.

5. The method of claim 1, wherein, for each entry in the listing, differences between characteristics of the selected security rule and the corresponding other security rule are highlighted in the rules similarity visualization output.

6. The method of claim 1, further comprising:

performing, by the advanced rule analyzer, topic modeling of a standards organization framework definition for security rules to identify at least one of categories or topics of the framework;

determining, by the advanced rule analyzer, for each security rule in the plurality of security rules of the security rule set data structure, an alignment of the security rule with the at least one of categories or topics of the framework based on a similarity analysis of results of natural language processing of the security rule and results of the topic modeling; and outputting, by the advanced rule analyzer, a notification of the alignment of the security rule set data structure with the at least one of categories or topics of the framework, to an authorized computing device for output to an authorized person associated with the computing environment.

7. The method of claim 1, further comprising:

performing, by the advanced rule analyzer, natural language processing of standard security rules stored in a standard security rules repository to identify terms present in the standard security rules;

determining, by the advanced rule analyzer, for each security rule in the plurality of security rules of the security rule set data structure, an alignment of the security rule with the standard security rules repository based on a similarity analysis of results of natural language processing of the security rule and results of the natural language processing of the standard security rules; and outputting, by the advanced rule analyzer, a notification of the alignment of the security rule set data structure with the standard security rules repository, to an authorized computing device for output to an authorized person associated with the computing environment, wherein the notification identifies one or more standard security rules in the standard security rules repository that do not have a corresponding security rule in the security rule set data structure.

8. The method of claim 7, further comprising:

automatically adding, by the advanced rule analyzer, the one or more standard security rules in the standard security rules repository that do not have a corresponding security rule in the security rules set data structure, to the security rule set data structure as part of the modified security rule set data structure.

9. A computer program product comprising a computer readable storage medium having a computer readable program stored therein, wherein the computer readable program, when executed on a computing device, causes the computing device to implement an advanced rule analyzer that operates to:

perform natural language processing of a security rule set data structure, specifying a plurality of security rules, to identify textual descriptions of tests performed by each of the security rules in the security rule set data structure;

execute, for each security rule pairing comprising a pairing of a first security rule in a plurality of security rules with a second security rule in the plurality of security rules, a determination of a similarity measure indicating a degree of similarity of the textual description of the first security rule in the pairing with the textual description of the second security rule in the pairing, and in response to the security measure being equal to or above duplicate rule threshold value, eliminating one of the first security rule or the second security rule in the pairing from the security rule set data structure to generate a modified security rule set data structure;

deploy the modified security rule set data structure to a computing environment for use in identifying security incidents and performing event management;

generate a rule similarity visualization output comprising, for each security rule pairing, a correlation between the first security rule and the second security rule in the security rule pairing and a visual indicator of a degree of similarity between the first security rule and the second security rule in the security rule pairing; and output the rule similarity visualization output to an authorized computing device for output to an authorized person associated with the computing environment, wherein each entry in the listing comprises, for the corresponding other security rule, one or more characteristics of the corresponding other security rule comprising at least one of a rule identifier, rule name, tests performed by the corresponding other security rule, and a similarity measure for a security rule pair comprising the selected security rule and the other security rule.

10. The computer program product of claim 9, wherein the computer readable program further causes the advanced rule analyzer to perform natural language processing on the security rule set data structure further at least by:

performing, for each security rule in the security rule set data structure, a statistical analysis of occurrences of terms in a test portion of the security rule to generate a vector representation of the security rule, wherein the vector representation comprises a plurality of vector values, each vector value being associated with a corresponding term in a recognized vocabulary, and wherein each vector value is set to a value corresponding to a statistical significance of a corresponding term based on results of the statistical analysis.

11. The computer program product of claim 9, wherein the computer readable program further causes the advanced rule analyzer, for each security rule pair, to:

perform merge analysis on the similarity measure associated with the security rule pairing to determine if the similarity measure of the security rule pairing is equal to or greater than a merge threshold value; and in response to the similarity measure associated with the security rule pairing being equal to or greater than the merge threshold value, perform security rule merging to replace the first security rule and the second security rule in the security rule pairing with a replacement security rule comprising elements of both the first security rule and the second security rule.

12. The computer program product of claim 9, wherein the rule similarity visualization output comprises a heat map visualization in which visual characteristics of regions of the heat map visualization corresponding to security rule pairs represent degrees of similarity between the first security rule and the second security rule of the security rule pair.

13. The computer program product of claim 9, wherein, for each entry in the listing, differences between characteristics of the selected security rule and the corresponding other security rule are highlighted in the rules similarity visualization output.

14. The computer program product of claim 9, wherein the computer readable program further causes the advanced rule analyzer to:

perform topic modeling of a standards organization framework definition for security rules to identify at least one of categories or topics of the framework;

determine, for each security rule in the plurality of security rules of the security rule set data structure, an alignment of the security rule with the at least one of categories or topics of the framework based on a similarity analysis of results of natural language processing of the security rule and results of the topic modeling; and output a notification of the alignment of the security rule set data structure with the at least one of categories or topics of the framework, to an authorized computing device for output to an authorized person associated with the computing environment.

15. The computer program product of claim 9, wherein the computer readable program further causes the advanced rule analyzer to:

perform natural language processing of standard security rules stored in a standard security rules repository to identify terms present in the standard security rules;

determine, for each security rule in the plurality of security rules of the security rule set data structure, an alignment of the security rule with the standard security rules repository based on a similarity analysis of results of natural language processing of the security rule and results of the natural language processing of the standard security rules; and output a notification of the alignment of the security rule set data structure with the standard security rules repository, to an authorized computing device for output to an authorized person associated with the computing environment, wherein the notification identifies one or more standard security rules in the standard security rules repository that do not have a corresponding security rule in the security rule set data structure.

16. An apparatus comprising:

a processor; and a memory coupled to the processor, wherein the memory comprises instructions which, when executed by the processor, cause the processor to implement an advanced rule analyzer that operates to:

perform natural language processing of a security rule set data structure, specifying a plurality of security rules, to identify textual descriptions of tests performed by each of the security rules in the security rule set data structure;

execute, for each security rule pairing comprising a pairing of a first security rule in a plurality of security rules with a second security rule in the plurality of security rules, a determination of a similarity measure indicating a degree of similarity of the textual description of the first security rule in the pairing with the textual description of the second security rule in the pairing, and in response to the security measure being equal to or above duplicate rule threshold value, eliminating one of the first security rule or the second security rule in the pairing from the security rule set data structure to generate a modified security rule set data structure;

deploy the modified security rule set data structure to a computing environment for use in identifying security incidents and performing event management;

generate a rule similarity visualization output comprising, for each security rule pairing, a correlation between the first security rule and the second security rule in the security rule pairing and a visual indicator of a degree of similarity between the first security rule and the second security rule in the security rule pairing; and output the rule similarity visualization output to an authorized computing device for output to an authorized person associated with the computing environment, wherein each entry in the listing comprises, for the corresponding other security rule, one or more characteristics of the corresponding other security rule comprising at least one of a rule identifier, rule name, tests performed by the corresponding other security rule, and a similarity measure for a security rule pair comprising the selected security rule and the other security rule.

* * * * *